United States Patent
Auston

(10) Patent No.: US 11,524,188 B2
(45) Date of Patent: Dec. 13, 2022

(54) TENSIONING DEVICE

(71) Applicant: CHECKMATE LIFTING & SAFETY LTD, Kent (GB)

(72) Inventor: Oliver Auston, Faversham (GB)

(73) Assignee: CHECKMATE LIFTING & SAFETY LTD, Kent (GB)

( * ) Notice: Subject to any disclaimer, the term of this patent is extended or adjusted under 35 U.S.C. 154(b) by 442 days.

(21) Appl. No.: 16/593,989

(22) Filed: Oct. 5, 2019

(65) Prior Publication Data

US 2020/0108283 A1  Apr. 9, 2020

Related U.S. Application Data

(60) Provisional application No. 62/743,031, filed on Oct. 9, 2018.

(51) Int. Cl.
*A62B 35/00* (2006.01)
(52) U.S. Cl.
CPC .................... *A62B 35/0025* (2013.01)
(58) Field of Classification Search
CPC ... A43C 11/165; A43C 11/20; A62B 35/0025; F16G 11/12; Y10T 24/2183; Y10T 24/2187; B65H 75/4428
See application file for complete search history.

(56) References Cited

U.S. PATENT DOCUMENTS

| | | | |
|---|---|---|---|
| RE26,584 E | 5/1969 | Spence | |
| 4,633,599 A * | 1/1987 | Morell | A43C 11/165 242/389 |
| 4,811,620 A | 3/1989 | Old et al. | |
| 4,976,383 A | 12/1990 | Norris | |
| 4,979,693 A | 12/1990 | Eberhardt et al. | |
| 5,027,874 A | 7/1991 | Gazzola | |
| 5,152,038 A * | 10/1992 | Schoch | A43C 11/165 242/400 |
| 5,157,813 A | 10/1992 | Carroll | |
| 5,638,588 A * | 6/1997 | Jungkind | A43C 11/165 24/68 SK |
| 5,934,599 A | 8/1999 | Hammerslag | |
| 5,953,761 A | 9/1999 | Jurga et al. | |
| 6,032,297 A | 3/2000 | Barthold et al. | |

(Continued)

FOREIGN PATENT DOCUMENTS

| | | |
|---|---|---|
| CN | 104394809 A | 3/2015 |
| CN | 104737999 A | 7/2015 |

(Continued)

OTHER PUBLICATIONS

Royter, Adam, "Daiwa's New Era of Fly", Fishing Monthly Magazines, May 2011, 9 pages.

(Continued)

*Primary Examiner* — Brian D Mattei
*Assistant Examiner* — Kathleen M. McFarland
(74) *Attorney, Agent, or Firm* — Dicke, Billig & Czaja, PLLC

(57) ABSTRACT

A tensioning device could be used in many different applications such as but not limited to a combination safety harness and tensioning device. The tensioning device could be a positioning device and a strap tensioner for the safety harness. The combination safety harness and tensioning device could be used with any suitable tensioning device.

21 Claims, 25 Drawing Sheets

(56) References Cited

U.S. PATENT DOCUMENTS

| | | | |
|---|---|---|---|
| 6,202,953 B1 | 3/2001 | Hammerslag | |
| 6,289,558 B1 | 9/2001 | Hammerslag | |
| 6,351,874 B1 | 3/2002 | Suggs | |
| 6,378,465 B1 | 4/2002 | Austin | |
| 6,736,346 B1 | 5/2004 | Park | |
| 6,971,476 B2 | 12/2005 | Wolner et al. | |
| 7,043,772 B2 | 5/2006 | Bielefeld et al. | |
| 7,073,627 B2 | 7/2006 | Casebolt et al. | |
| 7,093,518 B2 | 8/2006 | Gmeilbauer | |
| 7,111,572 B1* | 9/2006 | Yang | B63B 17/02 114/361 |
| 7,178,632 B2 | 2/2007 | Casebolt et al. | |
| 7,591,050 B2 | 9/2009 | Hammerslag | |
| 7,600,660 B2* | 10/2009 | Kasper | A45F 3/047 2/338 |
| 7,806,842 B2 | 10/2010 | Stevenson et al. | |
| 7,954,204 B2* | 6/2011 | Hammerslag | A43C 11/16 36/50.5 |
| 7,992,261 B2 | 8/2011 | Hammerslag et al. | |
| 8,091,182 B2 | 1/2012 | Hammerslag et al. | |
| 8,177,025 B2 | 5/2012 | Lang et al. | |
| 8,333,262 B1 | 12/2012 | Carpenter et al. | |
| 8,468,657 B2 | 6/2013 | Soderberg et al. | |
| 8,480,022 B2 | 7/2013 | Kang et al. | |
| 8,516,662 B2* | 8/2013 | Goodman | B65H 75/4431 36/50.5 |
| 8,707,486 B2 | 4/2014 | Chella et al. | |
| 8,727,073 B2 | 5/2014 | Lang et al. | |
| 8,757,531 B2 | 6/2014 | Bradley | |
| 8,794,378 B2 | 8/2014 | Wolner | |
| 8,858,482 B2 | 10/2014 | Ingimundarson et al. | |
| 8,967,332 B2 | 3/2015 | Wolner | |
| 9,101,181 B2* | 8/2015 | Soderberg | A43C 11/165 |
| 9,179,729 B2* | 11/2015 | Cotterman | A42B 3/08 |
| 9,248,040 B2 | 2/2016 | Soderberg et al. | |
| 9,345,610 B2 | 5/2016 | Modglin | |
| 9,358,146 B2 | 6/2016 | Thorsteinsdottir et al. | |
| 9,375,053 B2 | 6/2016 | Burns et al. | |
| 9,408,437 B2 | 8/2016 | Goodman et al. | |
| 9,463,771 B2 | 10/2016 | Humbert et al. | |
| 9,486,654 B1 | 11/2016 | Carpenter et al. | |
| 9,554,933 B2 | 1/2017 | Ingimundarson et al. | |
| 9,629,417 B2* | 4/2017 | Cavanagh | A43C 11/165 |
| 9,649,515 B2 | 5/2017 | Theisen et al. | |
| 9,653,052 B2 | 5/2017 | Bedson | |
| 9,662,518 B1 | 5/2017 | Lay | |
| 9,681,705 B2* | 6/2017 | Trudel | F16G 11/12 |
| 9,770,070 B2* | 9/2017 | Cotterman | A43C 11/20 |
| 9,993,699 B2 | 6/2018 | Casebolt et al. | |
| 10,264,852 B2* | 4/2019 | Kim | A43C 11/165 |
| 10,470,525 B2* | 11/2019 | Chen | A43C 11/165 |
| 10,492,940 B2 | 12/2019 | Ingimundarson et al. | |
| 10,512,305 B2* | 12/2019 | Omarsson | A61F 5/01 |
| 10,617,546 B2* | 4/2020 | Turrini | A61F 5/0111 |
| 10,945,492 B2* | 3/2021 | Kim | A43C 7/08 |
| 11,192,748 B2* | 12/2021 | Kim | A44B 11/125 |
| 2002/0030133 A1 | 3/2002 | Ratzlaff | |
| 2002/0166915 A1* | 11/2002 | Sakata | B60R 16/027 242/388 |
| 2003/0047931 A1 | 3/2003 | Rees et al. | |
| 2003/0093853 A1 | 5/2003 | Maloney | |
| 2003/0098385 A1 | 5/2003 | Back | |
| 2005/0034222 A1 | 2/2005 | Durocher | |
| 2005/0087115 A1 | 4/2005 | Martin | |
| 2005/0205356 A1 | 9/2005 | Velasco, Jr. | |
| 2005/0237864 A1 | 10/2005 | Albisetti | |
| 2005/0247813 A1* | 11/2005 | Kovacevich | A42B 3/08 242/395 |
| 2006/0015988 A1 | 1/2006 | Philpott et al. | |
| 2006/0195974 A1 | 9/2006 | Burkhart et al. | |
| 2011/0147125 A1* | 6/2011 | Blomberg | A62B 35/0081 188/161 |
| 2011/0197362 A1 | 8/2011 | Chella et al. | |
| 2011/0214223 A1 | 9/2011 | Rogers et al. | |
| 2013/0047483 A1 | 3/2013 | Chapin | |
| 2014/0358054 A1* | 12/2014 | Capra | A61F 5/0102 602/16 |
| 2015/0005685 A1* | 1/2015 | Chetlapalli | A61F 5/0125 602/16 |
| 2015/0007422 A1* | 1/2015 | Cavanagh | A43C 11/165 29/434 |
| 2015/0032041 A1 | 1/2015 | Ingimundarson et al. | |
| 2015/0089779 A1 | 4/2015 | Lawrence et al. | |
| 2015/0151070 A1 | 6/2015 | Capra et al. | |
| 2015/0190262 A1 | 7/2015 | Capra et al. | |
| 2015/0191326 A1* | 7/2015 | Hall | B65H 75/4431 242/396.4 |
| 2015/0237962 A1 | 8/2015 | Soderberg et al. | |
| 2015/0257489 A1 | 9/2015 | Trudel | |
| 2015/0342303 A1 | 12/2015 | Soderberg et al. | |
| 2016/0058130 A1* | 3/2016 | Boney | A43B 3/36 24/712.6 |
| 2016/0066653 A1* | 3/2016 | Piva | A43B 5/00 248/332 |
| 2016/0089554 A1 | 3/2016 | Perner | |
| 2016/0120267 A1* | 5/2016 | Burns | A43C 9/00 24/68 C |
| 2016/0157561 A1 | 6/2016 | Schum et al. | |
| 2016/0286903 A1 | 10/2016 | Whewell et al. | |
| 2016/0361577 A1 | 12/2016 | Perner et al. | |
| 2017/0027287 A1 | 2/2017 | Burns et al. | |
| 2017/0119104 A1 | 5/2017 | Soderberg et al. | |
| 2017/0135448 A1 | 5/2017 | Ingimundarson et al. | |
| 2017/0203680 A1* | 7/2017 | Mahaffey | F16M 7/00 |
| 2017/0303643 A1* | 10/2017 | Converse | A61C 7/026 |
| 2017/0303644 A1 | 10/2017 | Cavanagh et al. | |
| 2017/0311682 A1 | 11/2017 | Trudel et al. | |
| 2017/0348130 A1* | 12/2017 | Petursson | A61F 5/0109 |
| 2017/0354206 A1* | 12/2017 | Hammerslag | A43C 1/00 |
| 2018/0160775 A1* | 6/2018 | Pollack | A43C 7/00 |
| 2018/0178751 A1 | 6/2018 | Katsuramaki et al. | |
| 2018/0187441 A1* | 7/2018 | Underwood | E04H 4/143 |
| 2018/0215594 A1 | 8/2018 | Friederichs et al. | |
| 2018/0319617 A1* | 11/2018 | Kim | A44B 11/125 |
| 2019/0144150 A1* | 5/2019 | Chen | A43C 11/165 100/32 |
| 2020/0108283 A1* | 4/2020 | Auston | F16G 11/12 |
| 2020/0128919 A1* | 4/2020 | Burt | E05C 3/122 |
| 2020/0346888 A1* | 11/2020 | Kruse | F16G 11/12 |

FOREIGN PATENT DOCUMENTS

| | | | | |
|---|---|---|---|---|
| CN | 105947812 A | | 9/2016 | |
| DE | 20305131 U1 | | 3/2003 | |
| DE | 10314421 B4 | | 5/2007 | |
| DE | 602004005006 T2 | | 12/2007 | |
| DE | 102010029208 A1 | | 11/2011 | |
| DE | 102012218344 A1 | | 4/2013 | |
| DE | 102011088168 A1 | | 6/2013 | |
| DE | 102015009700 A1 | | 2/2017 | |
| DE | 102017223826 A1 | | 6/2018 | |
| EP | 132744 A | * | 2/1985 | A43C 11/16 |
| EP | 1316522 A2 | | 6/2003 | |
| EP | 1588640 A1 | | 10/2005 | |
| EP | 1588640 A1 | * | 10/2005 | A44C 5/22 |
| EP | 1660191 B1 | | 5/2011 | |
| EP | 2389804 A2 | | 11/2011 | |
| EP | 2913232 A1 | | 9/2015 | |
| EP | 1660192 B1 | | 11/2015 | |
| EP | 2802298 B1 | | 3/2017 | |
| EP | 2414048 B1 | | 10/2017 | |
| EP | 2835152 B1 | | 11/2017 | |
| WO | 2004085302 A2 | | 10/2004 | |
| WO | 2007092786 A2 | | 8/2007 | |
| WO | WO-2007092786 A2 | * | 8/2007 | B60C 27/10 |
| WO | 2014205103 A1 | | 12/2014 | |
| WO | 2016048711 A1 | | 3/2016 | |
| WO | 2016200801 A1 | | 12/2016 | |
| WO | 2016200809 A1 | | 12/2016 | |
| WO | 2017017250 A1 | | 2/2017 | |

(56) References Cited

FOREIGN PATENT DOCUMENTS

OTHER PUBLICATIONS

RIFFE Shop, Low-Pro Horizontal Reel product brochure, accessed online at https://speargun.com/pages/reels on Jul. 24, 2018, 3 pages.
MSA Evotech (R) Full Body Harness product brochure, Sep. 2014, 12 pages.
Chorost, Michael, "A True Bionic Limb Remains Far Out of Reach", Wired Magazine, Mar. 20, 2012, 18 pages.
Delph, Michael A. et al. "Rehabilitative Robotic Glove", Major Qualifying Project Report, Worcester Polytechnic Institute, 2012, 88 pages.
Ossur, Unloader One (R), Osteoarthritis Knee Braces product brochure, Known of prior to filing date, 3 pages.
Techno Spine (R), TLSO-Scoliosis Brace product brochure, Known of prior to filing date, 6 pages.
International Search Report and Written Opinion for PCT/GB2019/052827, 21 pages, Eva Bleijs-Hortas, dated Apr. 7, 2020.
Annex to Form PCT/ISA/206 Communication Relating to the Results of the Partial International Search for PCT/GB2019/052827, dated Jan. 29, 2020, 4 pages.

\* cited by examiner

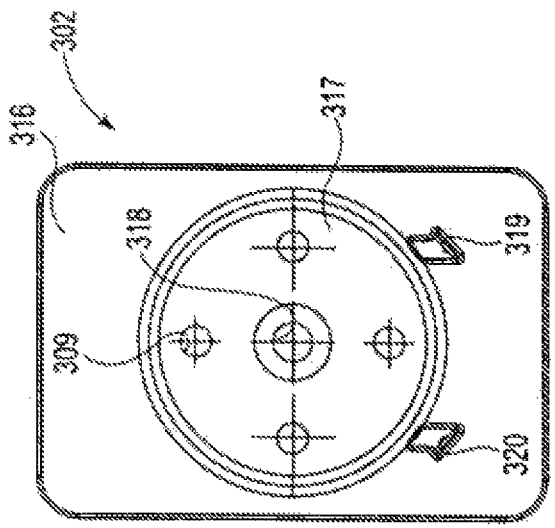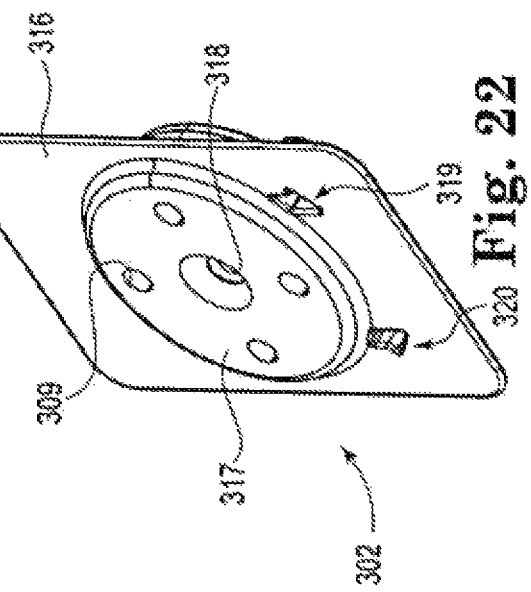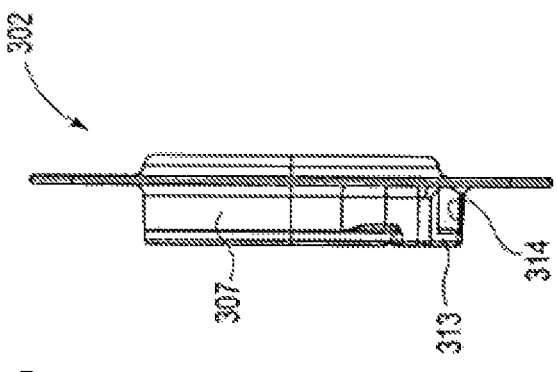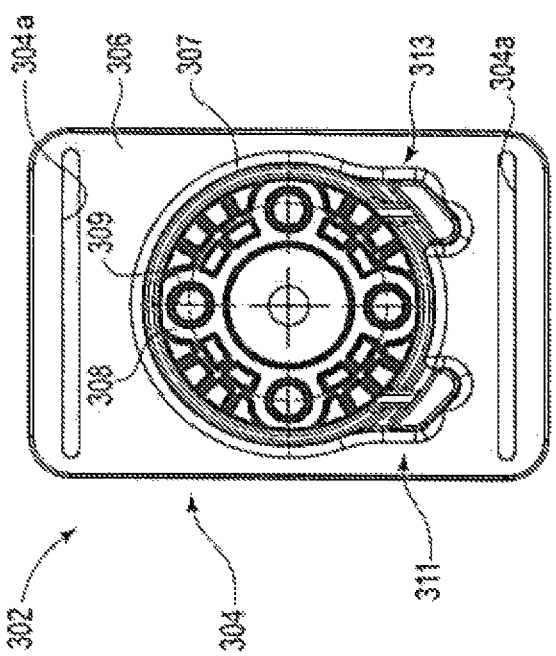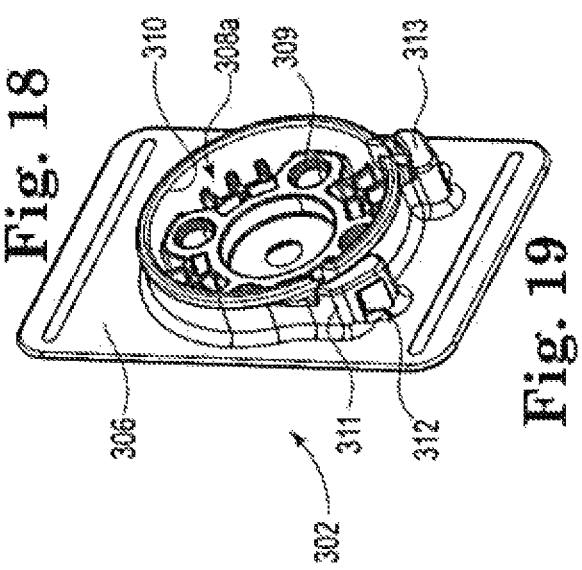

TENSIONING DEVICE

This application claims the benefit of U.S. Provisional Patent Application Ser. No. 62/743,031, filed Oct. 9, 2018, which is incorporated by reference herein.

BACKGROUND

Fall protection equipment is commonly used to reduce a likelihood of a fall and/or injuries associated with a fall, particularly by users who perform tasks at heights or are at risk of falling. Generally, lifelines or lanyards typically interconnect anchorage structures and safety harnesses donned by users. The lifelines or lanyards allow the users to move and perform tasks while being connected to the anchorage structures. Should a user fall, the lifeline or lanyard limits the distance the user falls.

It is important for the safety harness to be properly adjusted and fitted about the user. A safety harness that is improperly adjusted may transfer the load from the lifeline or lanyard to an unsafe location on the user and lead to injury or even death. A safety harness that is too loose may allow the user to slip free from the harness during a fall. The ease of safety harness adjustment is a leading factor in the user's willingness to take the time to correctly adjust their harness. A difficult or unintuitive harness webbing adjuster may discourage the user from properly adjusting the harness to fit for each donning. Furthermore, some harness adjustment mechanisms allow excess webbing to dangle freely from the end of the adjuster, which may create additional snag or entanglement hazards in the workplace.

A user often connects a lifeline or a lanyard to a dorsal D-ring positioned on the back of the user's safety harness. To connect and disconnect the lifeline or lanyard, it may be difficult if the D-ring is in an awkward position relative to the user. During use, there are other positions relative to the safety harness where a positionable D-ring would be useful.

For the reasons stated above and for other reasons stated below, which will become apparent to those skilled in the art upon reading and understanding the present specification, there is a need in the art for a tensioning device and for a tensioning device that could be used with a safety harness.

BRIEF SUMMARY

The above-mentioned problems associated with prior devices are addressed by embodiments of the disclosure and will be understood by reading and understanding the present specification. The following summary is made by way of example and not by way of limitation.

In one embodiment, a tensioning device comprises a housing, an engaging assembly, a rotating member, and an elongate member. The housing includes a cavity. The engaging assembly is operatively connected to the housing and has an engaging member and a biasing member. The engaging member is movable between an engaged position and a disengaged position. The biasing member urges the engaging member into the engaged position. The rotating member is configured and arranged to be received in the cavity and rotatably operatively connected to the housing. The rotating member has a base and a flange. The flange has a receiver configured and arranged to receive a portion of the engaging member. The receiver is selectively aligned with the engaging member as the rotating member rotates. The elongate member has a first end operatively connected to the rotating member and an intermediate portion windable about the base. The rotating member is rotatable in a first direction and a second direction relative to the housing, the second direction being opposite the first direction. The engaging member is positioned within the receiver in the engaged position to assist in preventing rotation of the rotating member in the first and second directions, wherein rotation of the rotating member overcomes the biasing member to move the engaging member into the disengaged position and out of the receiver to allow rotation in the first and second directions. The biasing member moves the engaging member into the engaged position when the engaging member is selectively aligned with the receiver.

In one embodiment, a combination safety harness and tensioning device comprises a harness strap, a connector, an elongate member, and a tensioning device. The connector is operatively connected to the harness strap proximate a first location, the connector being moveable relative to at least a portion of the harness strap. The elongate member has a first end, a second end, and an intermediate portion, the first end being operatively connected to the connector. The tensioning device is operatively connected to the harness strap proximate a second location, the second location being different than the first location. The second end of the elongate member is operatively connected to the tensioning device and a portion of the intermediate portion of the elongate member extends between the tensioning device and the connector. The tensioning device is moveable to vary a length of the intermediate portion extending between the tensioning device and the connector thereby moving the connector relative to the at least a portion of the harness strap.

BRIEF DESCRIPTION OF THE DRAWINGS

The present disclosure can be more easily understood, and further advantages and uses thereof can be more readily apparent, when considered in view of the detailed description and the following Figures in which:

FIG. 18 is a top view of a housing of the tensioning device shown in FIG. 11;

FIG. 19 is a top perspective view of the housing shown in FIG. 18;

FIG. 20 is a side view of the housing shown in FIG. 18;

FIG. 21 is a bottom view of the housing shown in FIG. 18;

FIG. 22 is a bottom perspective view of the housing shown in FIG. 18;

In accordance with common practice, the various described features are not drawn to scale but are drawn to emphasize specific features relevant to the present disclosure. Reference characters denote like elements throughout the Figures and the text.

DETAILED DESCRIPTION

In the following detailed description, reference is made to the accompanying drawings, which form a part hereof, and in which is shown by way of illustration embodiments in which the disclosure may be practiced. It is to be understood that other embodiments may be utilized and mechanical changes may be made without departing from the spirit and scope of the present disclosure. The following detailed description is, therefore, not to be taken in a limiting sense.

Embodiments of the disclosure provide a tensioning device and a combination safety harness and tensioning device. The tensioning device could be used in many different applications such as but not limited to a combination safety harness and tensioning device, and the tensioning device could serve as a positioning device and as a strap tensioner. The combination safety harness and tensioning device could be used with any suitable tensioning device such as but not limited to the examples described herein.

Figure 1:
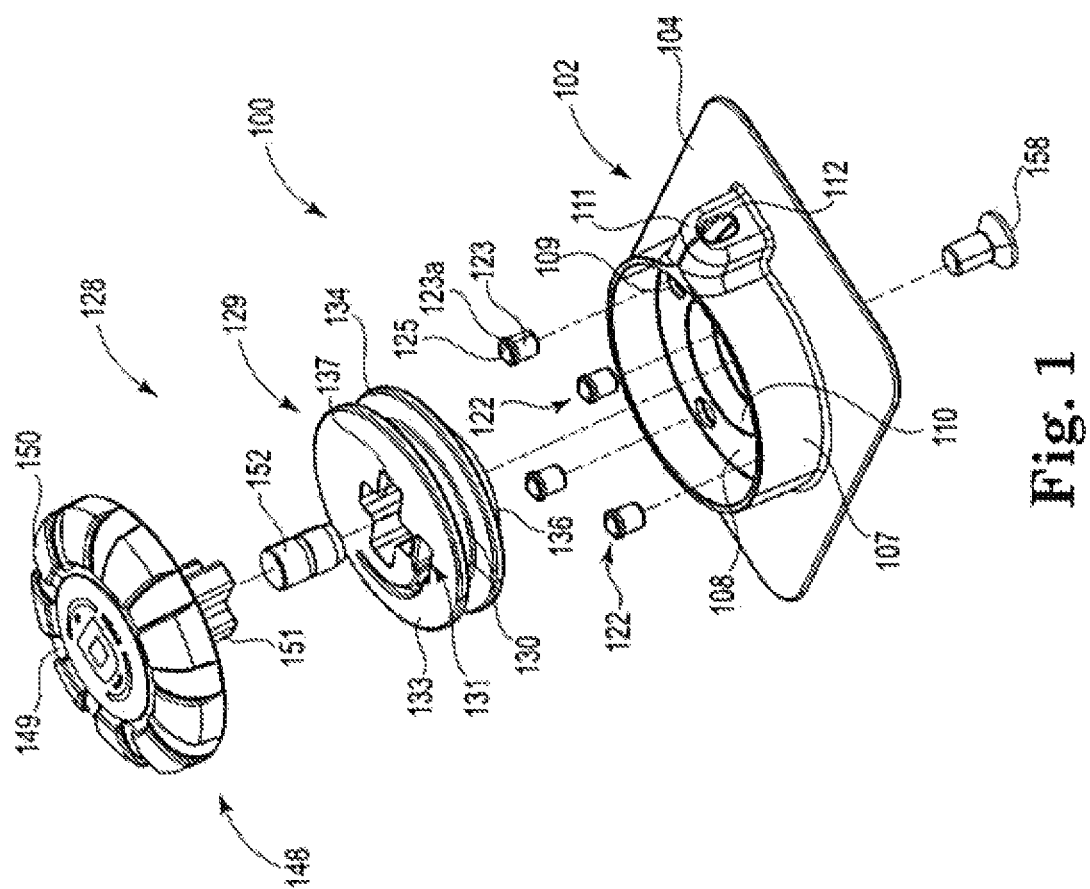
FIG. 1 is an exploded perspective view of an embodiment tensioning device constructed in accordance with the principles of the present invention.
Figure 2:
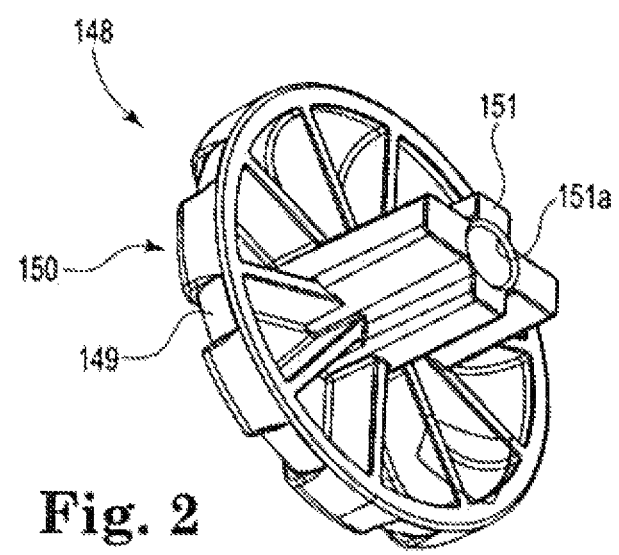
FIG. 2 is a bottom perspective view of a dial of the tensioning device shown in FIG. 1.
Figure 3:
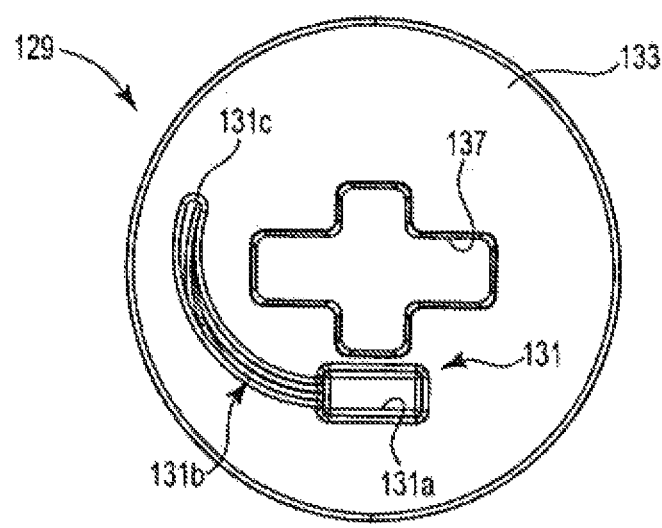
FIG. 3 is a top view of a reel of the tensioning device shown in FIG. 1.
Figure 4:
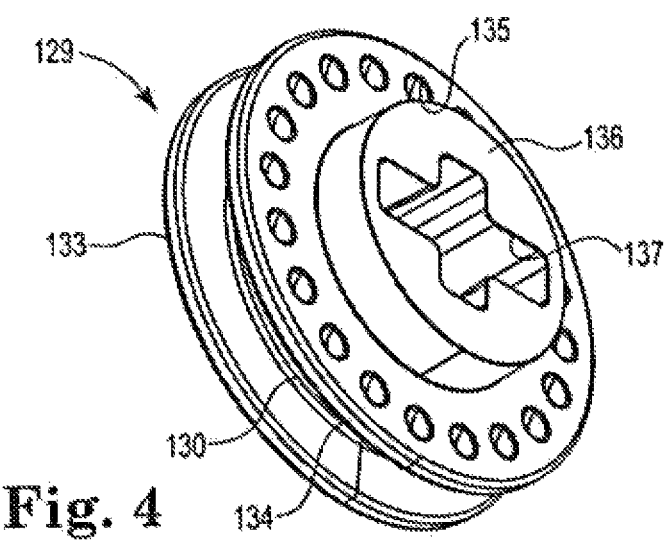
FIG. 4 is bottom perspective view of the reel shown in FIG. 3.
Figure 5:
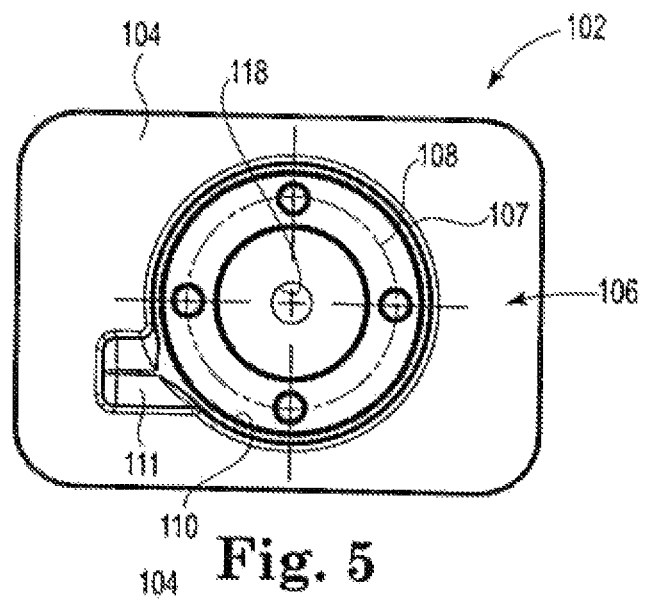
FIG. 5 is a top view of a housing of the tensioning device shown in FIG. 1.
Figure 6:
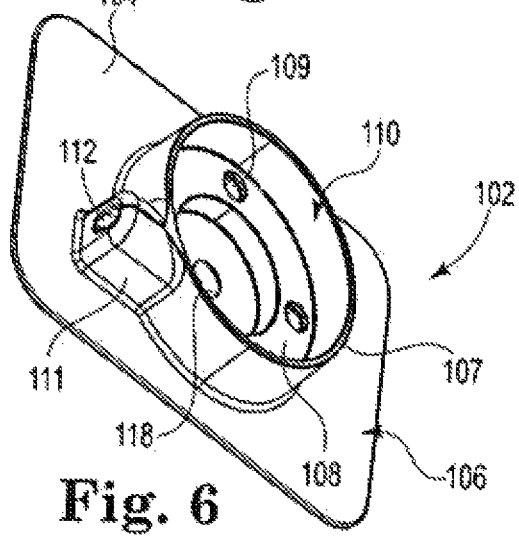
FIG. 6 is a top perspective view of the housing shown in FIG. 5.
Figure 7:
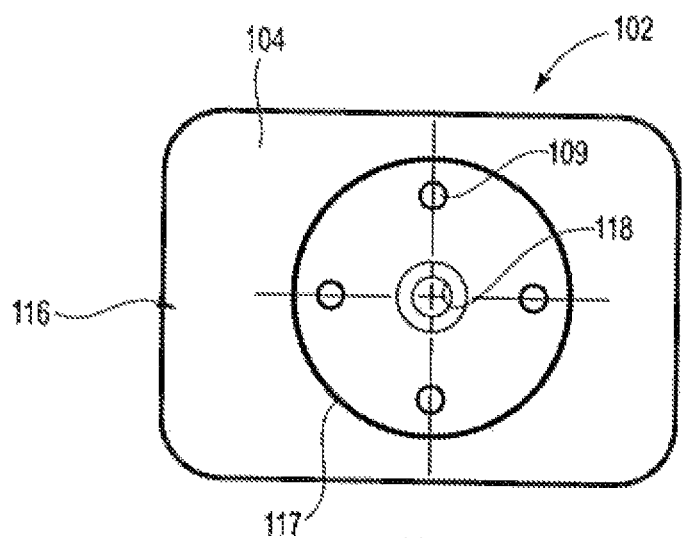
FIG. 7 is a bottom view of the housing shown in FIG. 5.
Figure 8:
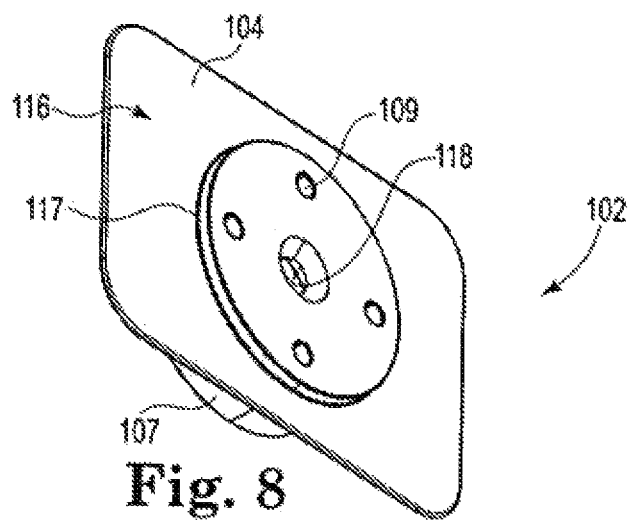
FIG. 8 is a bottom perspective view of the housing shown in FIG. 5.

An embodiment tensioning device 100, best shown in FIG. 1, includes a housing 102, an engaging assembly 122, a rotating member 128, and an elongate member 140. The housing 102 includes a plate portion 104 having a top 106 and a bottom 116. A cylindrical portion 107 extends upward from the top 106 and includes a ledge portion 108 proximate a bottom portion of the cylindrical portion 107 and the top 106. The ledge portion 108 includes at least one bore 109. This example includes four bores 109, but any suitable number of bore(s) could be used. The cylindrical portion 107 and the top 106 form a cavity 110. An exit guide path 111 having a bore 112 in communication with the cavity 110 extends outward from the cylindrical portion 107 proximate the top 106. The bottom 116 includes a protruding portion 117 through which a bore 118 extends and is in communication with the cavity 110. The cylindrical portion 107 and the protruding portion 117 are generally centered on the plate portion 104.

The engaging assembly 122 includes at least one assembly. This example includes four assemblies corresponding with the four bores 109 in the housing 102, but any suitable number of assembly/assemblies could be used. Each assembly includes a retaining member 123, which is generally cylindrical with a ledge or flange 123a extending outward proximate its top end, configured and arranged to house a biasing member (not shown) and an engaging member 125 such as a ball bearing. The biasing member is positioned between a bottom of the retaining member 123 and the engaging member 125 and urges the engaging member 125 toward the top of the retaining member 123. The retaining member 123 is configured and arranged to allow a portion of the engaging member 125 to extend outward therefrom. The bores 109 are counter sunk in this example to receive the ledges or flanges 123a of the retaining members 123.

The rotating member 128 includes a reel 129, a dial 148, a shaft 152, and a fastener 158. The reel 129 includes a generally cylindrical base 130 having a top from which a top flange 133 extends and a bottom from which a bottom flange 134 extends. The top flange 133 includes a receiver 131 having a stop receiver 131a configured and arranged to receive a stop 142 of an elongate member 140, a channel 131b configured and arranged to receive a portion of the elongate member 140, and an aperture 131c through which the elongate member extends to be positioned proximate the base 130 between the top and bottom flanges 133 and 134. The bottom flange 134 includes at least one receiver 135. In this example, the receiver 135 is at least one depression that extends at least partially through a bottom surface of the bottom flange 134 and could be a dimple, an aperture, or the like. An extension 136 is generally cylindrical and extends outward from the bottom flange 134 and is generally centered thereon. A bore 137 extends through the extension 136 and the top flange 133 and preferably includes a non-circular cross section. In this example, the bore 137 is generally plus "+" shaped.

The elongate member 140, which could be a cable, includes a first end 141 to which a stop 142 is connected, a second end 143 to which a stop 144 is connected, and an intermediate portion 145 between the first and second ends 141 and 143. In this example, the first end 141 is operatively connected to the reel as described above, and the intermediate portion 145 is generally configured and arranged to wind about the base 130 of the reel 129.

The dial 148 includes a base or flange portion 149, which could include ribbed portions 150 on its top surface to provide a better grip on the base or flange portion 149. The bottom surface could include voids, and an extension 151 extends downward from the bottom surface. The extension 151 is configured and arranged to be received by the bore 137. Therefore, in this example, the extension 151 is generally plus "+" shaped to fit within the bore 137. Other corresponding shapes could be used. The extension 151 includes bore 151a configured and arranged to receive a shaft 152 including a threaded bore 153. The shaft 152 is a friction fit within the bore 151a of the extension 151.

To assemble the tensioning device 100, the engaging assemblies 122 are positioned within the bores 109, the first end 141 of the elongate member 140 is connected to the reel 129, the second end 143 of the elongate member 140 is inserted through the bore 112 of the exit guide path 111 so that a portion of the intermediate portion 145 extends through the exit guide path 111, the reel 129 is positioned within the cavity 110 with the bottom flange 134 proximate the ledge portion 108, the extension 151 of the dial 148 including the shaft 152 is inserted into the bore 137, and then a fastener 158 is inserted through the bore 118 from the bottom 116 of the housing and threaded into a threaded bore 153 of the shaft 152. The rotating member 128 is rotatable about the fastener 158 relative to the housing 102. The non-circular cross sections of the bore 137 and the extension 151 and the friction fit between the bore 151a and the shaft 152, allow this rotation. It is recognized that the order of assembling the components could vary.

In operation, the dial 148, and therefore the rotating member 128, could be rotated in a first direction and a second direction. When the dial 148 is rotated, the reel 129 rotates. When rotated in one direction, the intermediate portion 145 is retracted into the housing 102 and wound about the base 130. When rotated in the other direction, the intermediate portion 145 is unwound from the base 130 and paid out from the housing 102. As the reel 129 rotates, the engaging members 125 move out of the receivers 135 and the bottom flange 134 moves the engaging members 125 downward into disengaged positions thereby compressing the biasing members. When the engaging members 125 selectively align with receivers 135, the biasing members move the engaging members upward into engaged positions to be positioned within the receivers 135. This occurs when rotated in either direction. In the engaged positions, the engaging members 125 assist in preventing rotation of the rotating member 128 in the first and second directions. If a plurality of receivers 135 are used, such as 20 in this example, the length of the intermediate portion 145 extending out of the housing 102 can be more finely tuned to a desired length. Any suitable number of receiver(s) could be used.

Figure 11:
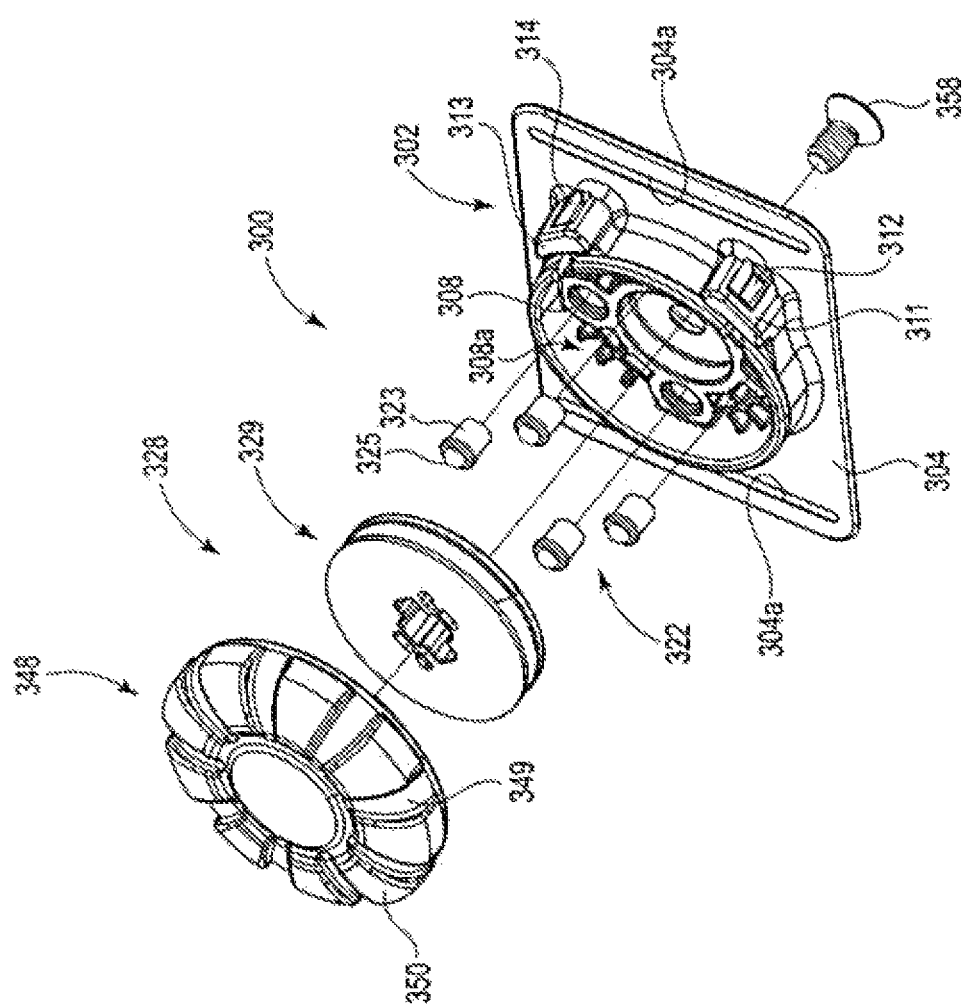
FIG. 11 is an exploded perspective view of another embodiment tensioning device constructed in accordance with the principles of the present invention.
Figure 12:
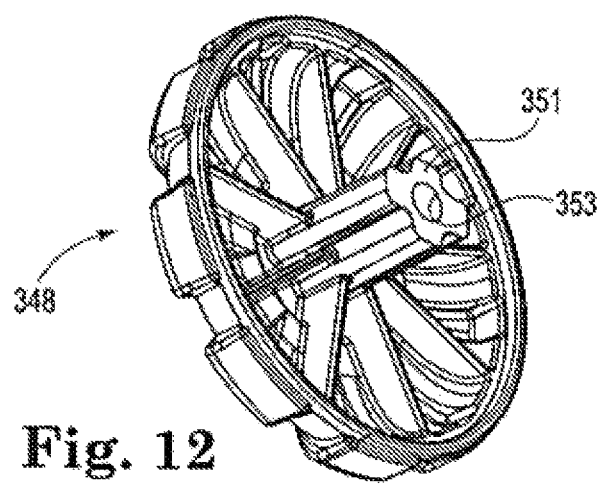
FIG. 12 is a bottom perspective view of a dial of the tensioning device shown in FIG. 10.
Figure 16:
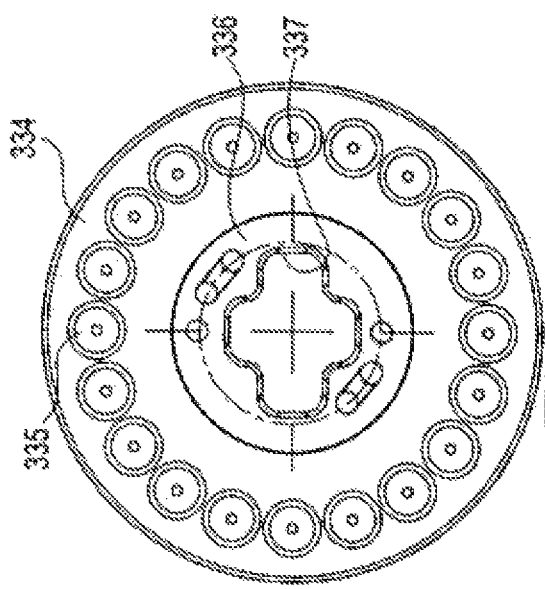
FIG. 16 is a bottom view of the reel shown in FIG. 13.
Figure 17:
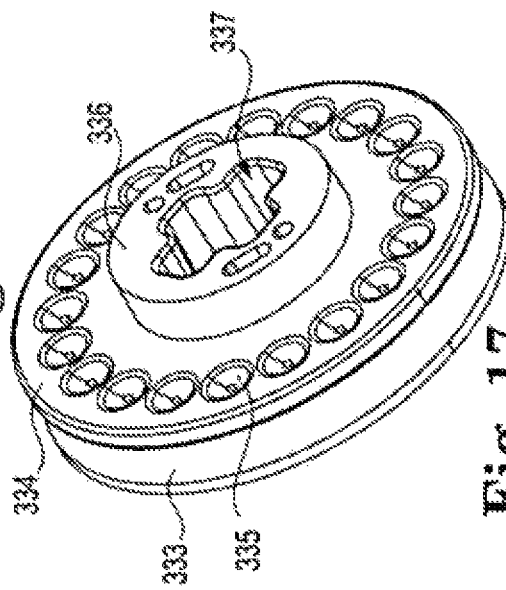
FIG. 17 is a bottom perspective view of the reel shown in FIG. 13.
Figure 15:
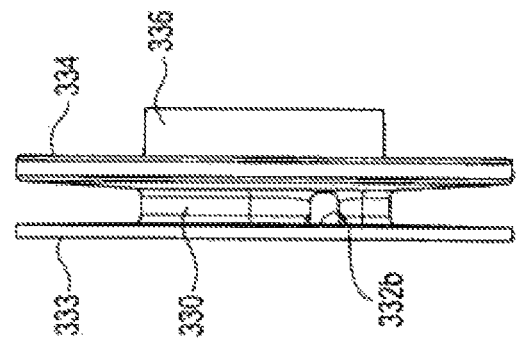
FIG. 15 is a side view of the reel shown in FIG. 13.
Figure 13:
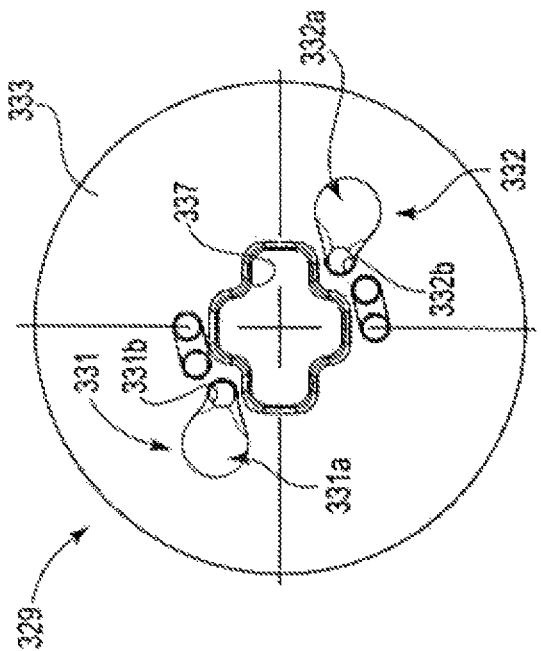
FIG. 13 is a top view of a reel of the tensioning device shown in FIG. 11.
Figure 14:
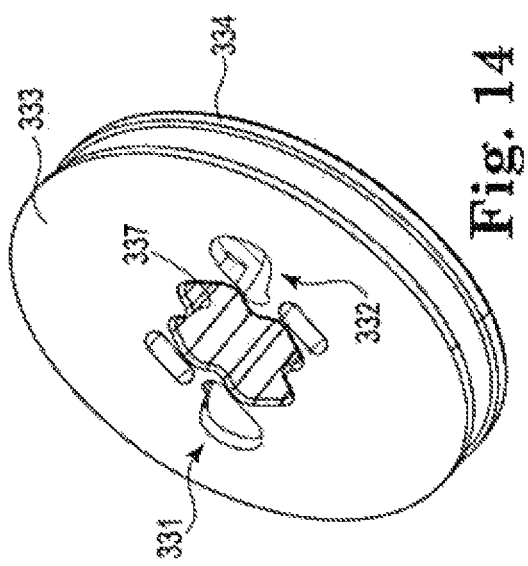
FIG. 14 is a top perspective view of the reel shown in FIG. 13.
Figure 23:
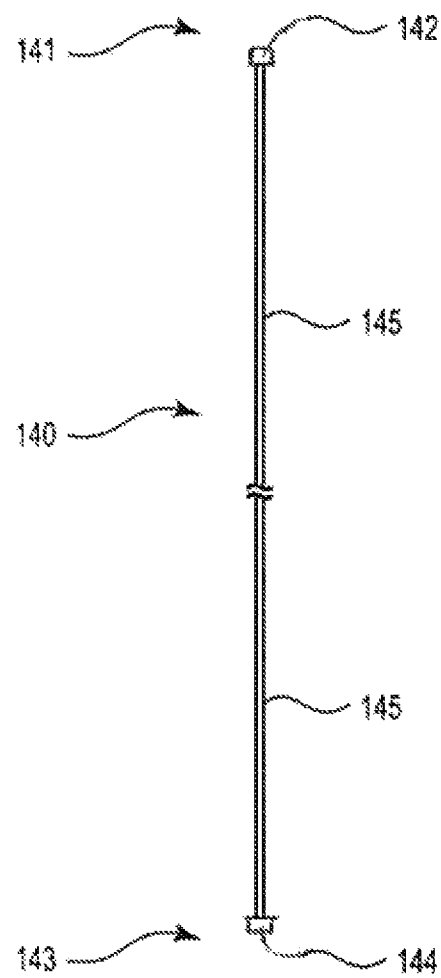
FIG. 23 is a schematic view of a cable for use with the tensioning devices shown in FIGS. 1 and 11.

An embodiment tensioning device 300, best shown in FIG. 11, includes a housing 302, an engaging assembly 322, a rotating member 328, and an elongate member 140. The housing 302 includes a plate portion 304 having a top 306 and a bottom 316. Optional slots 304a could be positioned proximate the ends to assist in securing the plate portion 304 to an anchor member. A cylindrical portion 307 extends upward from the top 306 and includes a ledge portion 308 proximate a bottom portion of the cylindrical portion 307 and the top 306. The ledge portion 308 includes at least one bore 309. Optionally, the ledge portion 308 could include voids 308a to reduce the weight of the housing 302. This example includes four bores 309, but any suitable number of bore(s) could be used. The cylindrical portion 307 and the top 306 form a cavity 310. A first exit guide path 311 having a bore 312 and a second exit guide path 313 having a bore 314 in communication with the cavity 310 extend outward from the cylindrical portion 307 proximate the top 306. The bottom 316 includes a protruding portion 317 through which a bore 318 extends and is in communication with the cavity 310. Moulding pockets 319 and 320 could be included to stop sinkage in the material, for example plastic. The cylindrical portion 307 and the protruding portion 317 are generally centered on the plate portion 304.

The engaging assembly 322 includes at least one assembly. This example includes four assemblies corresponding with the four bores 309 in the housing 302, but any suitable number of assembly/assemblies could be used. Each assembly includes a retaining member 323, which is generally cylindrical with a ledge or flange 323a extending outward proximate its top end, configured and arranged to house a biasing member 324 and an engaging member 325 such as a ball bearing. The biasing member 324 is positioned between a bottom of the retaining member 323 and the engaging member 325 and urges the engaging member 325 toward the top of the retaining member 323. The retaining member 323 is configured and arranged to allow a portion of the engaging member 325 to extend outward therefrom. The bores 309 are counter sunk in this example to receive the ledges or flanges 323a of the retaining members 323. Only one engaging assembly 322 is shown within a bore 309 in FIG. 9B.

The rotating member 328 includes a reel 329, a dial 348, a shaft 352, and a fastener 358. The reel 329 includes a generally cylindrical base 330 having a top from which a top flange 333 extends and a bottom from which a bottom flange 334 extends. The top flange 333 includes a first receiver 331 and a second receiver 332. The first receiver 331 has a first stop receiver 331a configured and arranged to receive a stop 142 of an elongate member 140 and an aperture 331b through which the elongate member extends to be positioned proximate the base 330 between the top and bottom flanges 333 and 334. The second receiver 332 has a second stop receiver 333a configured and arranged to receive a stop 144 of the elongate member 140 and an aperture 333b through which the elongate member extends to be positioned proximate the base 330 between the top and bottom flanges 333 and 334. The bottom flange 334 includes at least one receiver 335. In this example, the receiver 335 is at least one depression that extends at least partially through a bottom surface of the bottom flange 334 and could be a dimple, an aperture, or the like. An extension 336 is generally cylindrical and extends outward from the bottom flange 334 and is generally centered thereon. A bore 337 extends through the extension 336 and the top flange 333 and preferably includes a non-circular cross section. In this example, the bore 337 is generally plus "+" shaped.

The elongate member 140, which could be a cable, includes a first end 141 to which a stop 142 is connected, a second end 143 to which a stop 144 is connected, and an intermediate portion 145 between the first and second ends 141 and 143. In this example, the first end 141 is operatively connected to the reel as described above, and the intermediate portion 145 is generally configured and arranged to wind about the base 330 of the reel 329.

The dial 348 includes a base or flange portion 349, which could include ribbed portions 350 on its top surface to provide a better grip on the base or flange portion 349. The bottom surface could include voids, and an extension 351 extends downward from the bottom surface. The extension 351 is configured and arranged to be received by the bore 337. Therefore, in this example, the extension 351 is generally plus "+" shaped to fit within the bore 337. Other corresponding shapes could be used. The extension 351 includes bore 351a that is preferably threaded.

Figure 31:
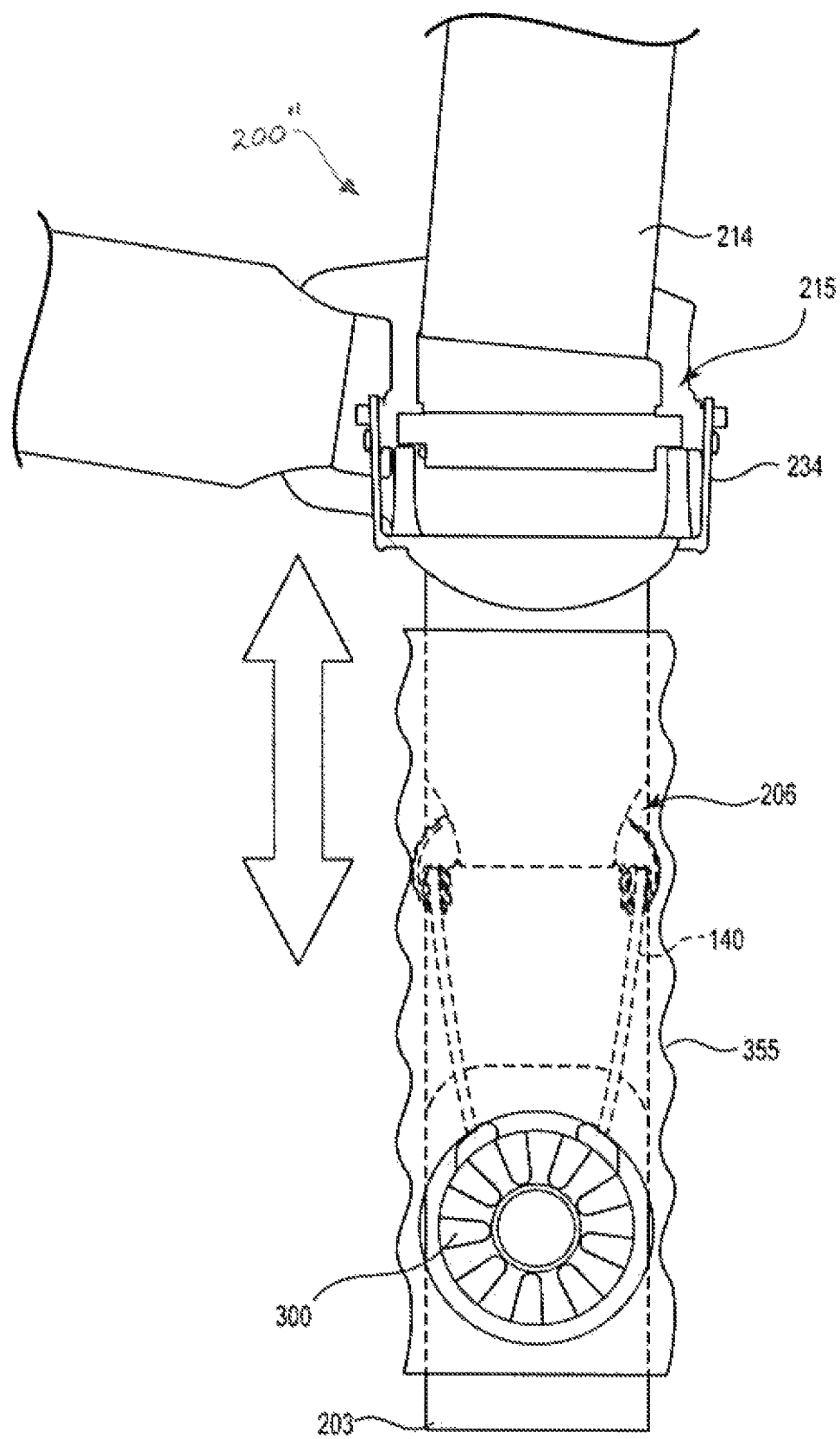
FIG. 31 is a plan view of another embodiment combination safety harness and tensioning device.

To assemble the tensioning device 300, the engaging assemblies 322 are positioned within the bores 309 and the reel 329 is positioned within the cavity 310 with the bottom flange 334 proximate the ledge portion 308. The first end 141 of the elongate member 140 is positioned in the first stop receiver 331a, the second end 143 of the elongate member 140 is inserted through the aperture 331b and the bore 312 of the first exit guide path 311 so that a portion of the intermediate portion 145 extends from proximate the base 330 through the first exit guide path 311. The second end 143 of the elongate member 140 is inserted through the bore 314 of the second exit guide path 313 and the aperture 332b so that the second end 143 is positioned in the second stop receiver 332a. This creates a loop in the intermediate portion of the elongate member 140 extending outward from the housing. The extension 351 of the dial 348 is inserted into the bore 337, and then a fastener 358 is inserted through the bore 318 from the bottom 316 of the housing and threaded into the bore 353 of the extension 351. The rotating member 328 is rotatable about the fastener 358 relative to the housing 302. The non-circular cross sections of the bore 337 and the extension 351 allow this rotation. It is recognized that the order of assembling the components could vary. Optionally, a sleeve 355 could be used to cover at least a portion of the elongate member 140 extending outward from the housing 302. The sleeve 355 is shown on safety harness 200" in FIG. 31. The sleeve 355 could expand and concertina as the length of the elongate member changes.

Figure 9A:
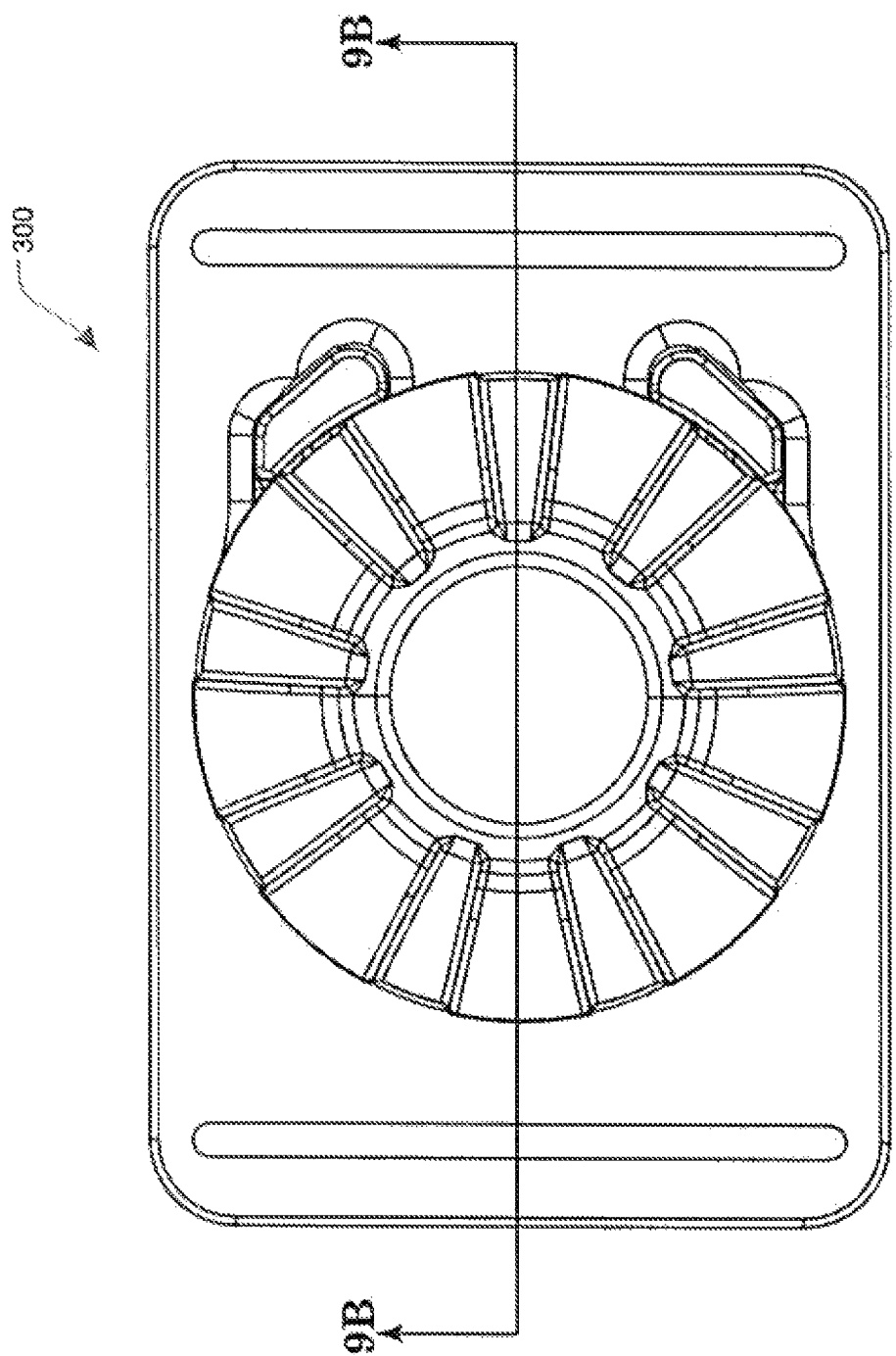
FIG. 9A is a top view of another embodiment tensioning device constructed in accordance with the principles of the present invention.
Figure 9B:
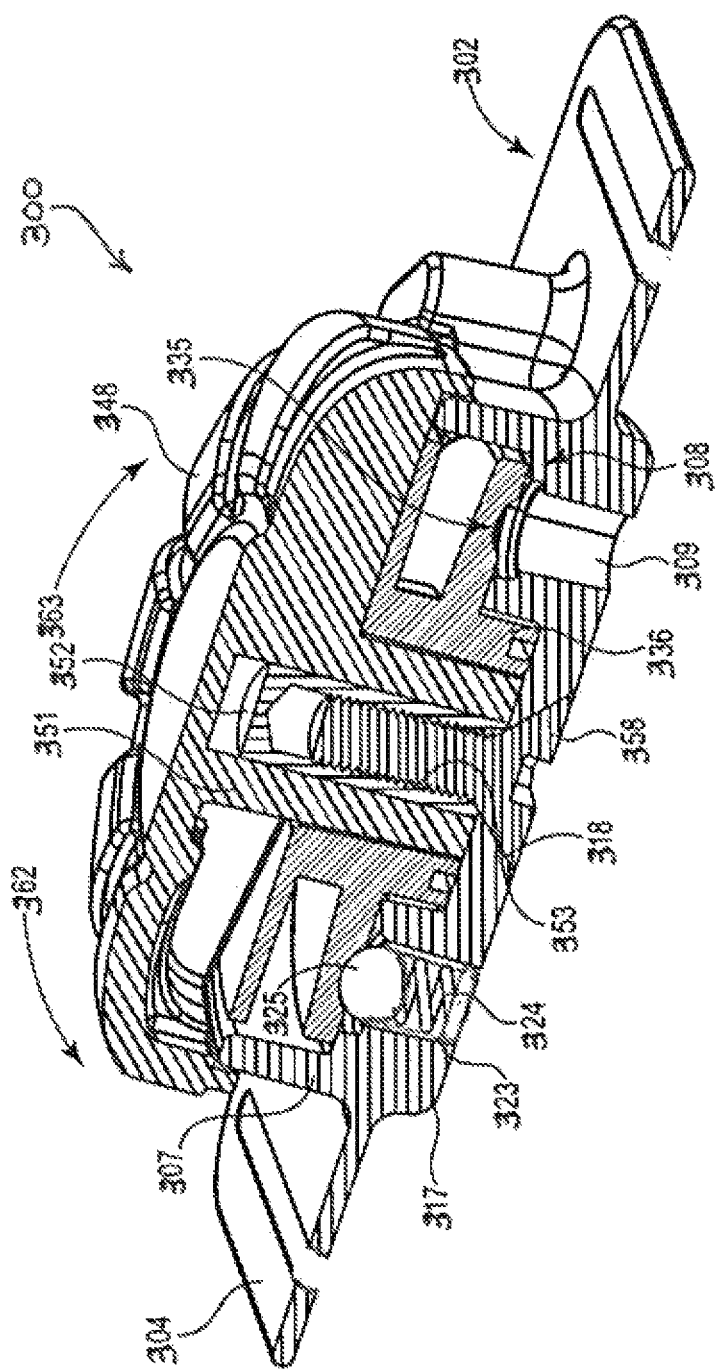
FIG. 9B is a cross-section view taken along the lines 9B-9B in FIG. 9A of the tensioning device shown in FIG. 9A in an engaged position.
Figure 10A:
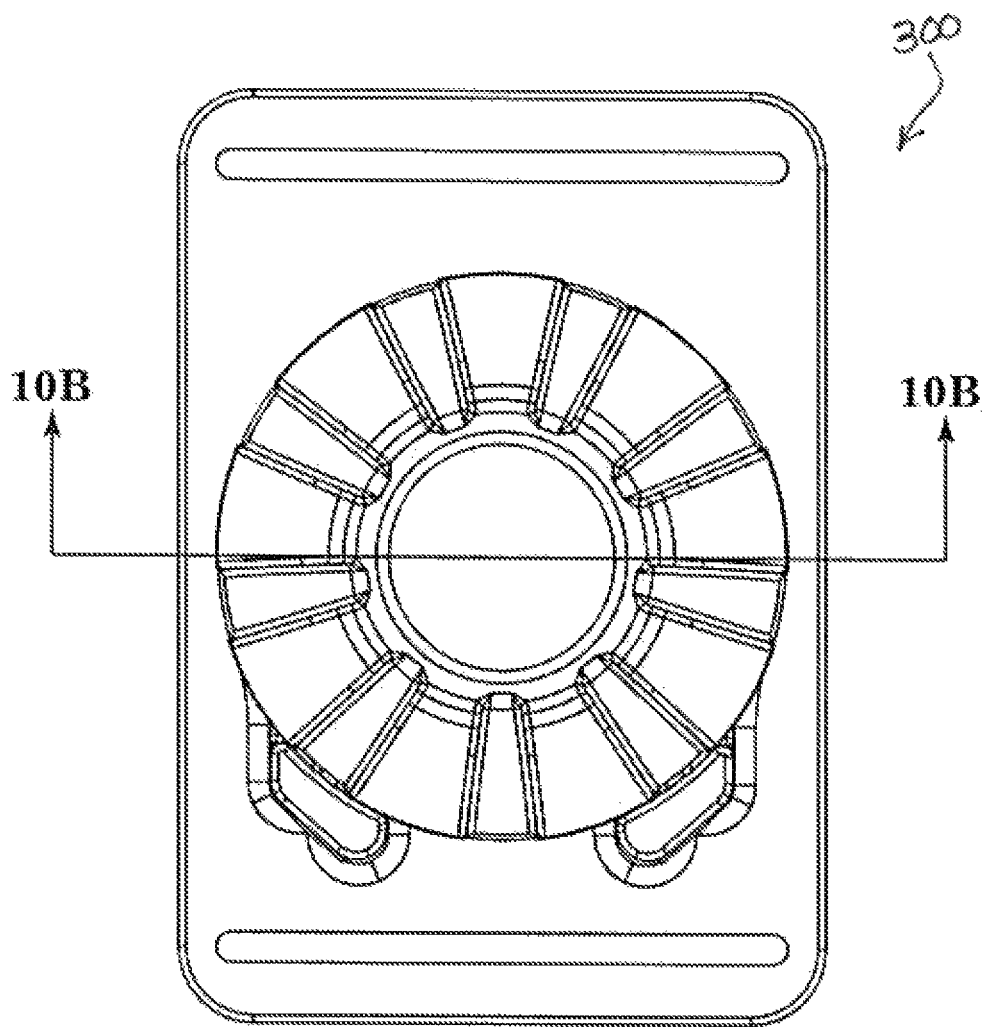
FIG. 10A is a top view of the tensioning device shown in FIG. 9A.
Figure 10B:
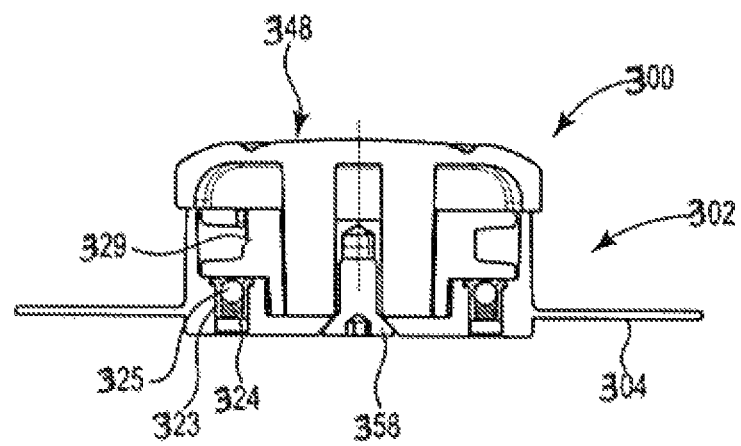
FIG. 10B is a cross-section view taken along the lines 10B-10B in FIG. 10A of the tensioning device shown in FIG. 9A in a disengaged position.

In operation, the dial 348, and therefore the rotating member 328, could be rotated in a first direction 362 and a second direction 363. When the dial 348 is rotated, the reel 329 rotates. When rotated in one direction, the intermediate portion 145 is retracted into the housing 302 and wound about the base 330. When rotated in the other direction, the intermediate portion 145 is unwound from the base 330 and paid out from the housing 302. Because both ends of the elongate member 140 are connected to the reel 329, the intermediate portion 145 is wound and unwound about the base 330 proximate both ends. As the reel 329 rotates, the engaging members 325 move out of the receivers 335 and the bottom flange 334 moves the engaging members 325 downward into disengaged positions thereby compressing the biasing members 324, for example as shown in FIG. 10B. When the engaging members 325 align with receivers 335, the biasing members 324 move the engaging members upward into engaged positions to be positioned within the receivers 335, for example as shown in FIG. 9B. This occurs when rotated in either direction. In the engaged positions, the engaging members 325 assist in preventing rotation of the rotating member 328 in the first and second directions. If a plurality of receivers 335 are used, such as 20 in this example, the length of the intermediate portion 345 extending out of the housing 302 can be more finely tuned to a desired length. Any suitable number of receiver(s) could be used.

An embodiment combination safety harness and tensioning device could be used with the tensioning device 100 or any other suitable tensioning device. Any suitable safety harness could be used.

Figure 24:
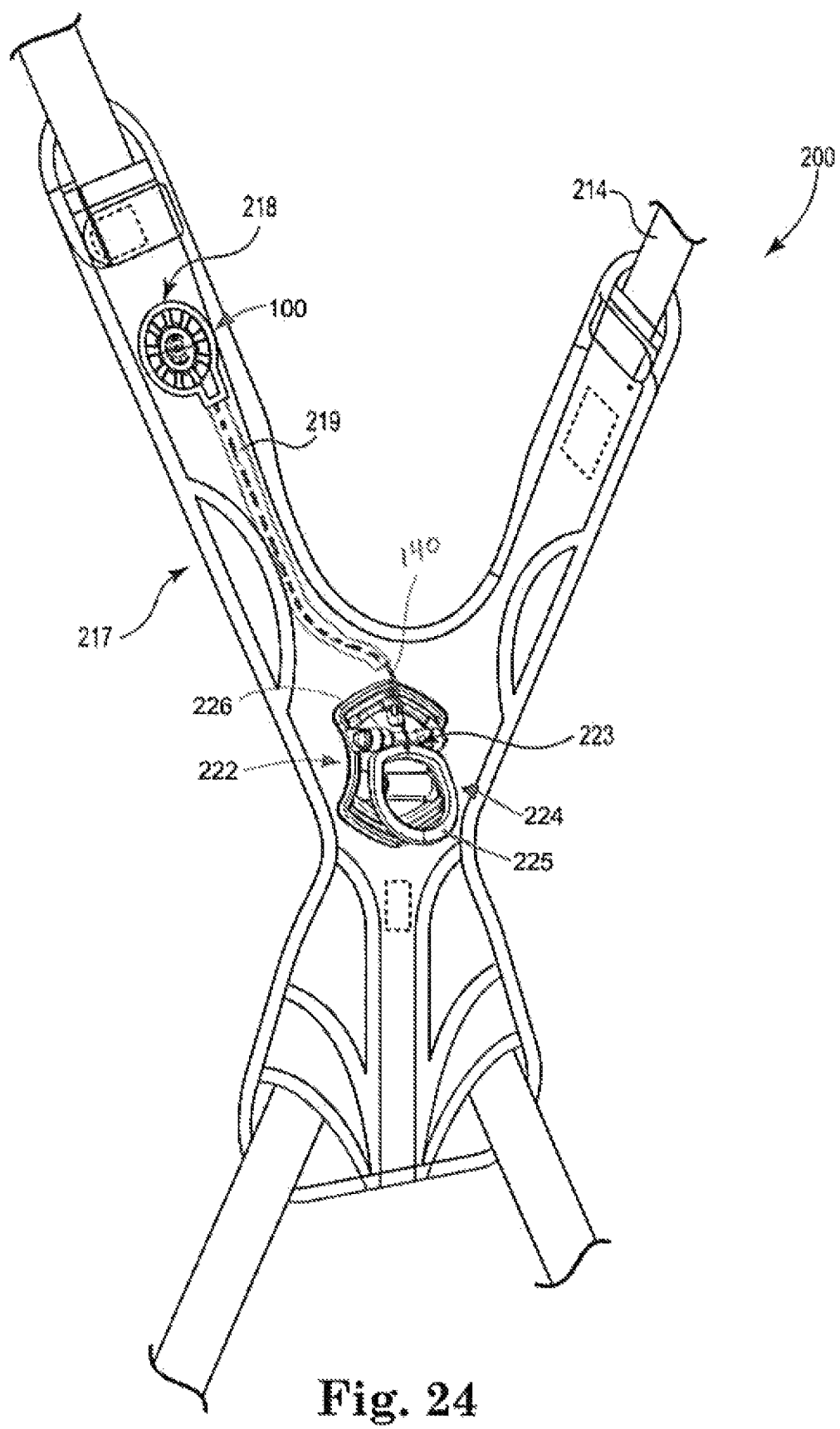
FIG. 24 is a top view of an embodiment combination safety harness and tensioning device.
Figure 25:
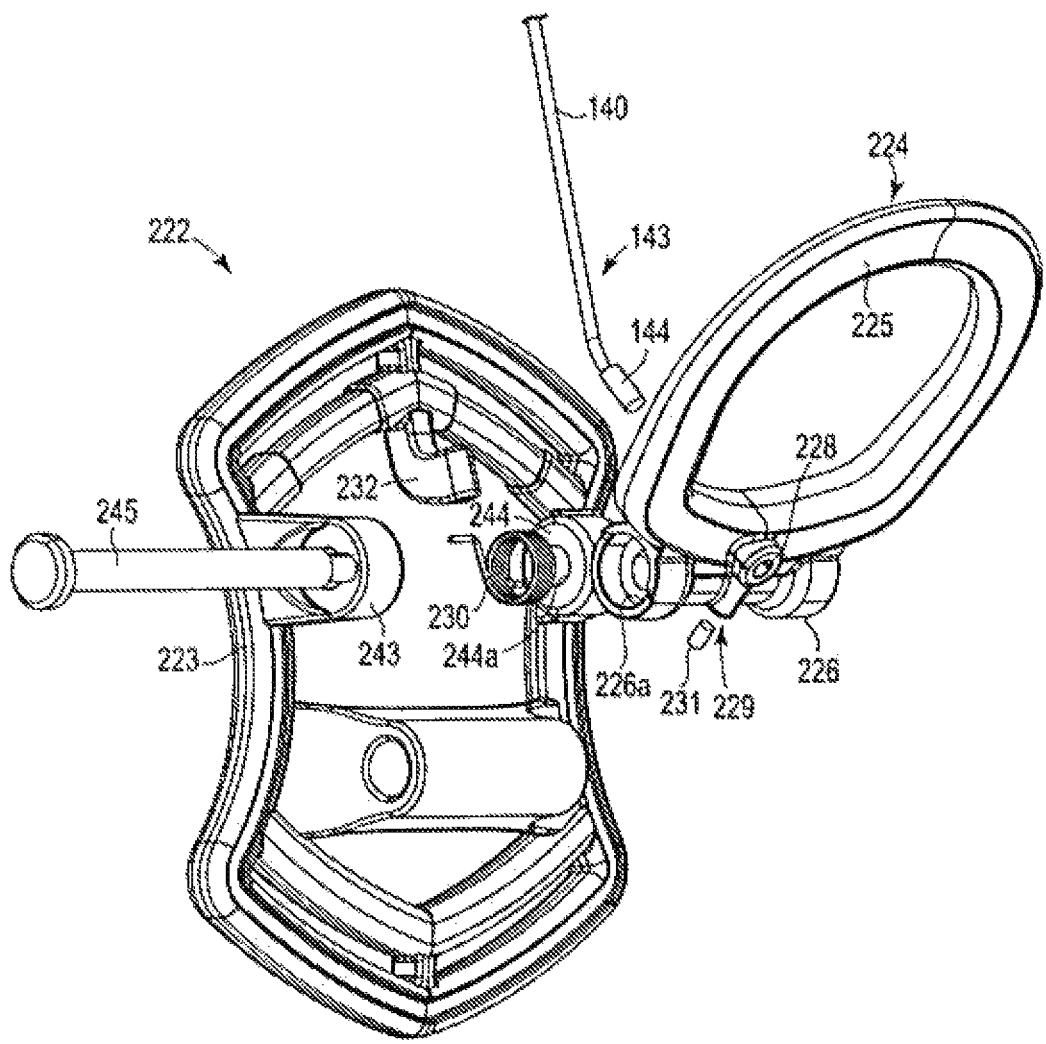
FIG. 25 is an exploded perspective view of a dorsal pad assembly for use with the combination safety harness and tensioning device of FIG. 24.

An example safety harness that could be used generally includes straps configured and arranged to be donned by a user as is well known in the art. As illustrated in FIG. 24, one example safety harness 200 includes padding 217 connected to the straps proximate the shoulder straps and the dorsal pad assembly. A connector 218 could be used to interconnect the padding 217 and the plate portion or flange 104 of the tensioning device 100 proximate a location, in this example preferably proximate the user's chest or other suitable location proximate the front of the user. In this example, the connector 218 includes an opening in the top layer of the padding so that the flange 104 is sandwiched between the top and bottom layers of the padding and the rotating member 128 extends outward through the opening. The padding 217 could include a channel 219 extending from proximate the connector 218 to proximate a dorsal pad assembly 222, the channel 219 being configured and arranged to slidably receive the intermediate portion 145 of the elongate member 140. The dorsal pad assembly 222 includes a base 223 through which the straps are routed to connect a D-ring 224 thereto. The D-ring 224 includes a ring portion 225, a bar portion 226, and an optional intermediate portion (not shown). The base 223 and the bar portion 226 are operatively connected to the harness straps as is well known in the art. Either the optional intermediate portion or the bar portion 226 includes a first bore 228 configured and arranged to receive the stop 144 of the elongate member 140 and includes a second bore 229 in communication with the first bore 228. The second bore 229 is configured and arranged to receive a fastener 231 such as a set screw, which extends through the second bore 229 into the first bore 228 and contacts the stop 144 to secure the second end 143 of the elongate member 140 to the D-ring 224, which in this example is proximate a location different than the location of the tensioning device 100, preferably proximate the back of the user. Optionally, the base 223 could include a guide 232 with a bore 233 through which the elongate member 140 extends between the channel 219 and the D-ring 224. Optionally, a biasing member 230 interconnects the base 223 and the D-ring 224 to place a biasing force on the D-ring 224. More specifically, the base 223 could include a first base extension 243 and a second base extension 244 configured and arranged to receive the bar portion 226 therebetween, and a fastener 245 could extend through a bore 243a in the first base extension 243, through a bore 226a of the bar portion 226, and through a bore 244a of the second base extension 244 to pivotally connect the D-ring 224 to the base 223. The biasing member 230 includes a first end operatively connected to the base 223 and a second end operatively connected to the bar portion 226. For example, the base 223 and the bar portion 226 could include bores or slots to receive the ends of the biasing member 230. Preferably, the biasing force is a downward force relative to the dorsal pad assembly 222.

Figure 26A:
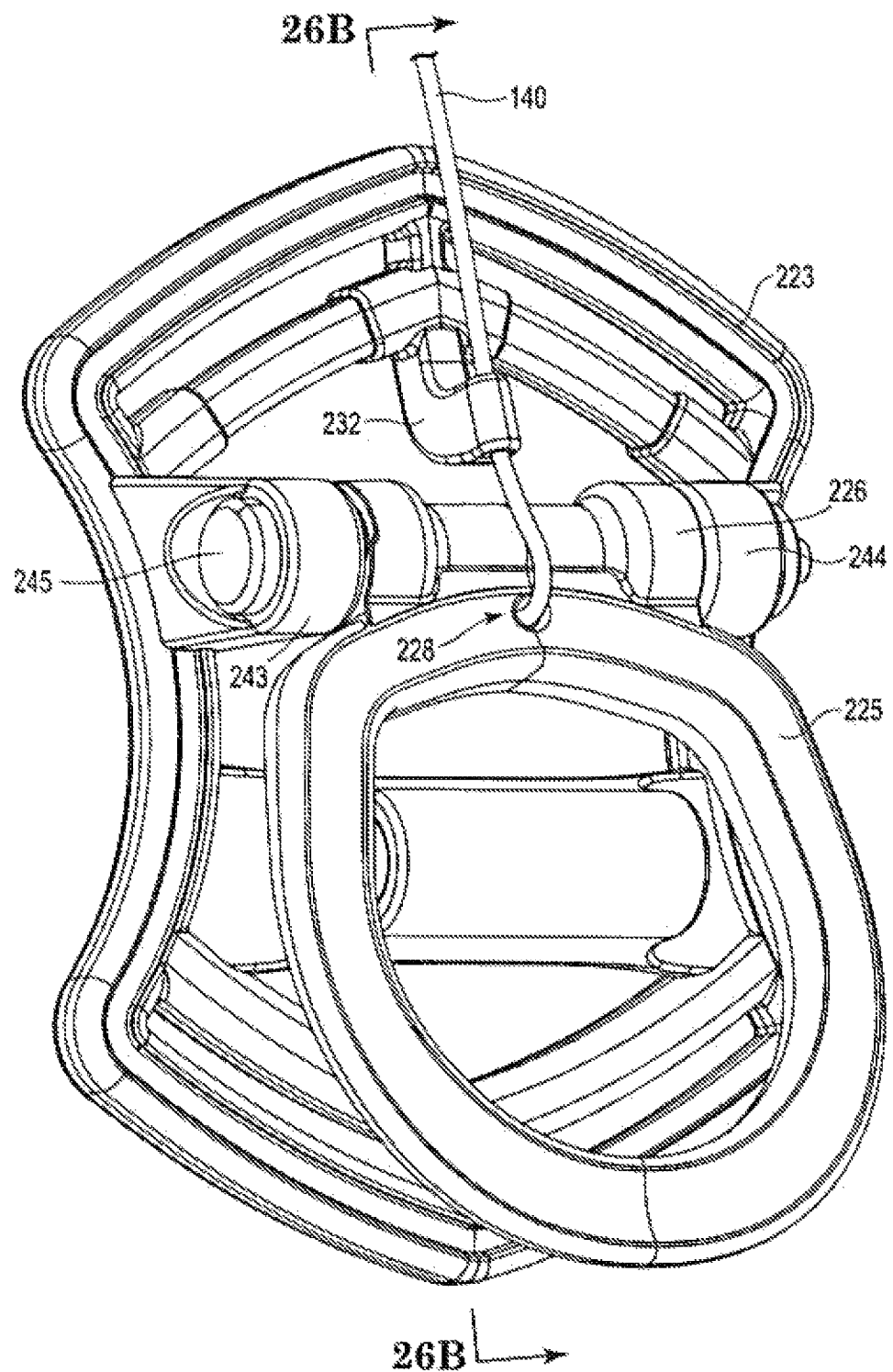
FIG. 26A is a perspective view of the dorsal pad assembly shown in FIG. 25 in a generally downward position.
Figure 26B:
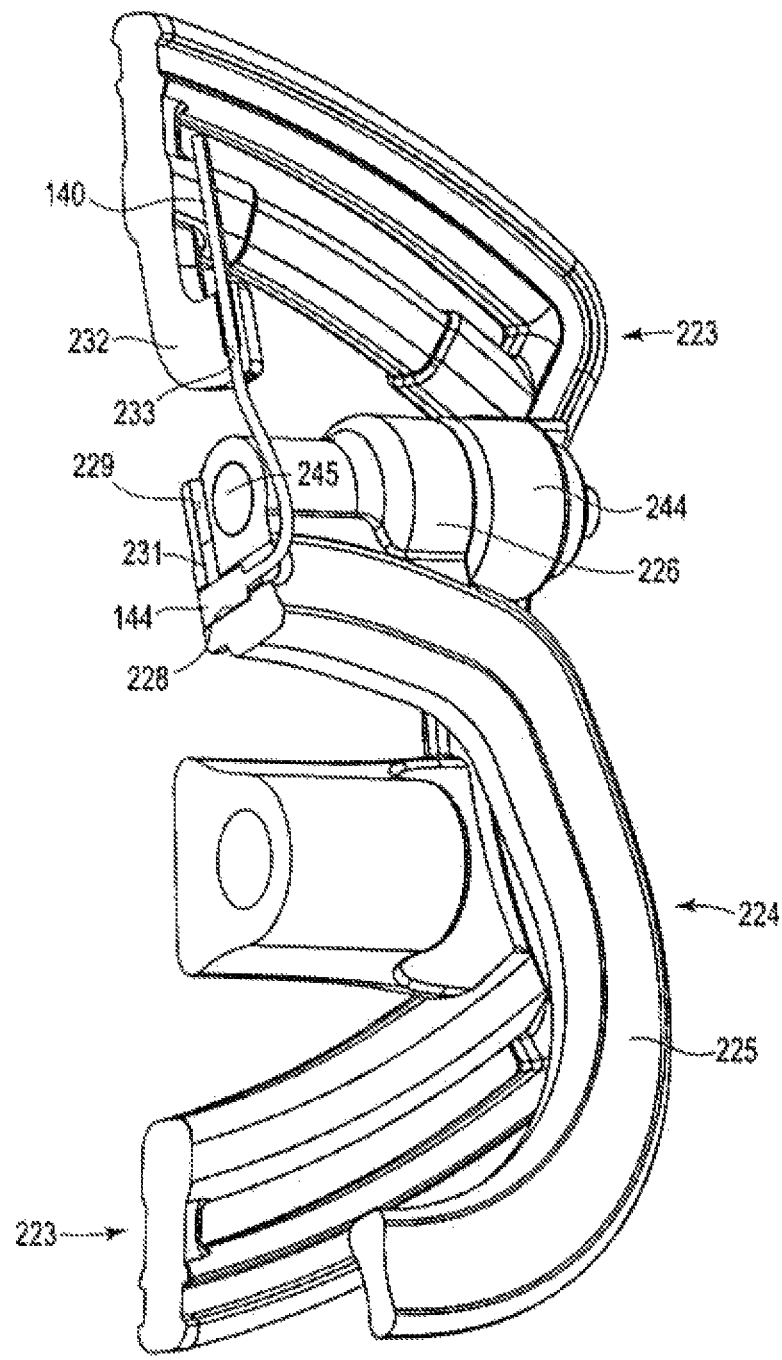
FIG. 26B is a cross-section view taken along the lines 26B-26B in FIG. 26A of the dorsal pad assembly shown in FIG. 26A.
Figure 27A:
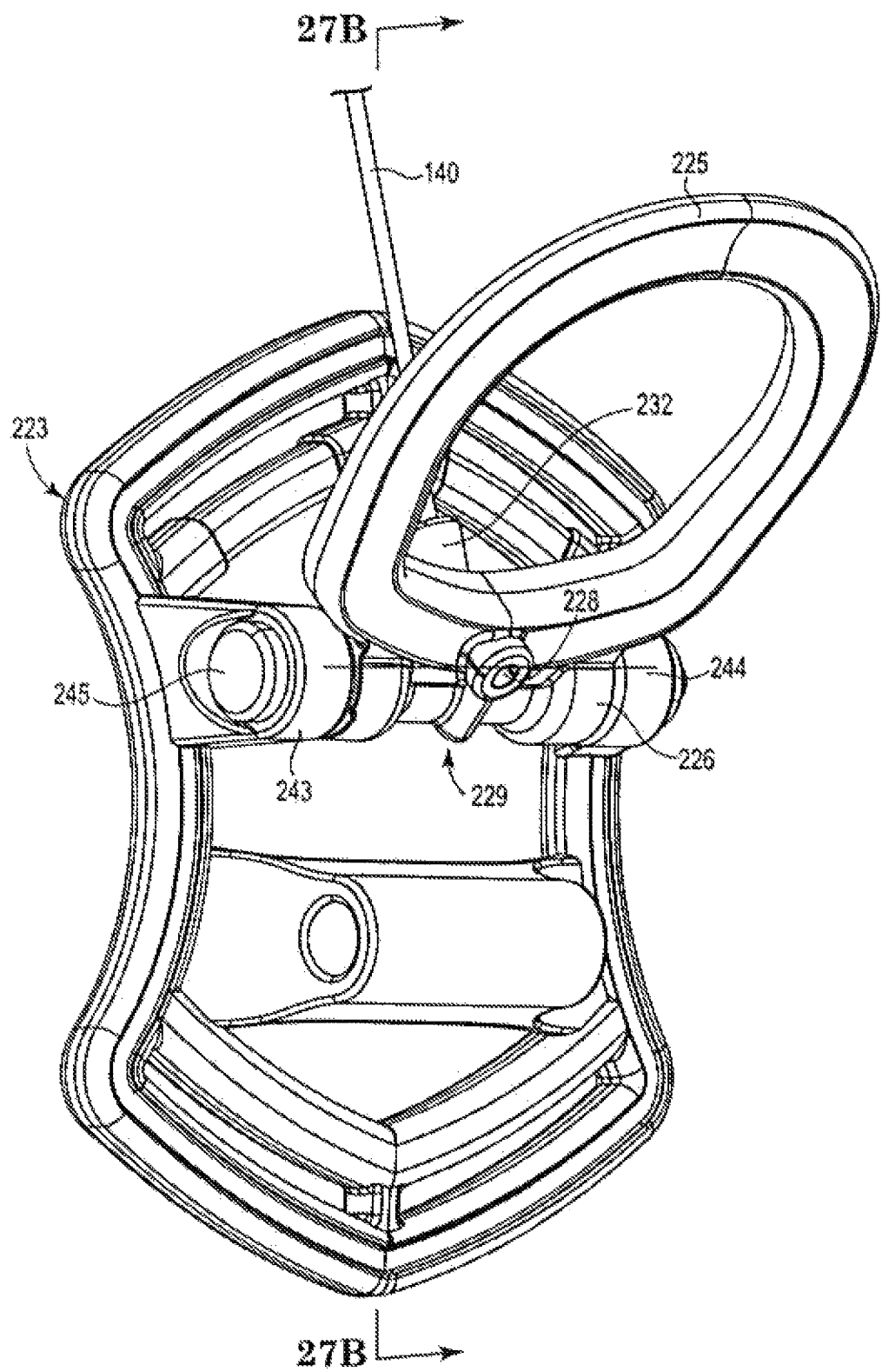
FIG. 27A is a perspective view of the dorsal pad assembly shown in FIG. 25 in a generally upward position.
Figure 27B:
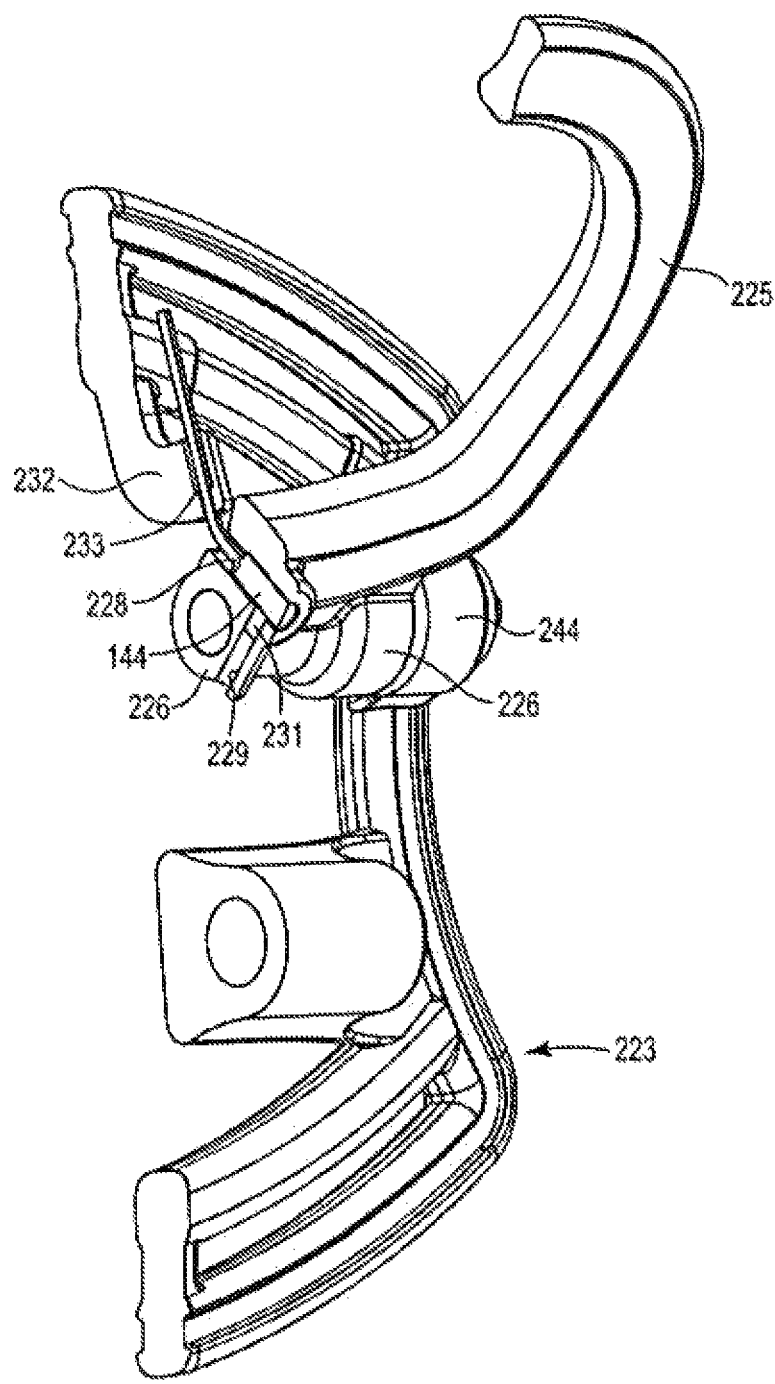
FIG. 27B is a cross-section view taken along the lines 27B-27B in FIG. 27A of the dorsal pad assembly shown in FIG. 27A.

In operation, elongate member 104 extends between the tensioning device 100 and the D-ring 224. If the elongate member 104 is routed through a channel 219, the channel 219 assists in preventing the elongate member 104 from getting caught on something during use. As the dial 148 is rotated in one direction, the intermediate portion 145 is retracted into the housing 102 and wound about the base 130. The length of the intermediate portion 145 extending outward from the housing 102 is shortened thereby moving the D-ring 224 toward an upward position. As the dial 148 is rotated in the other direction, the intermediate portion 145 is unwound from the base 130 and paid out from the housing 102. The length of the intermediate portion 145 extending outward from the housing 102 is lengthened thereby moving the D-ring 224 toward a downward position, for example as shown in FIG. 26A. The D-ring 224 could be selectively positioned in any one of several intermediate positions between a first, downward position and a second, upward position, for example as shown in FIG. 27A. If a biasing member 230 is used, then the D-ring 224 is urged into a downward position, but the length of the elongate member 140 determines the position of the D-ring 224. As the length of the elongate member 140 extending outward from the housing 102 is lengthened, the biasing member 230 assists in moving the D-ring 224 downward and taking up any slack in the elongate member 140. Preferably, the length of the elongate member 140 from its distal ends is selected to accommodate the D-ring 224 in the downward position.

Although this embodiment is shown with a tensioning device 100, it is recognized that any suitable tensioning device could be used. For example, the tensioning device could include ratchet pawls and a release mechanism or other suitable engaging assemblies instead of ball bearings.

Figure 32:
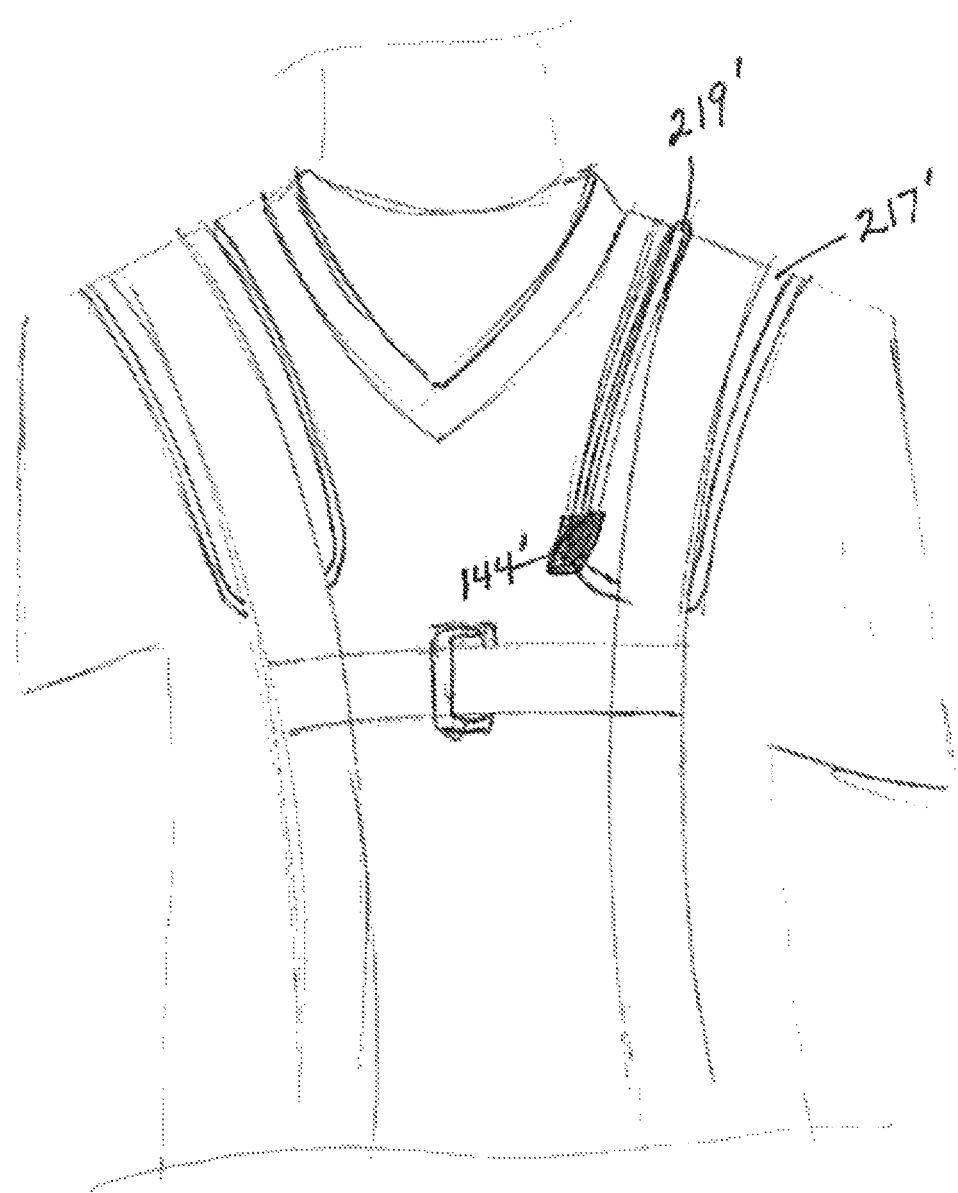
FIG. 32 is a plan view of another embodiment combination safety harness and tensioning device.

Alternatively, as illustrated in FIG. 32, the elongate member could interconnect the D-ring and a portion of the harness, for example proximate the chest strap. For example, the elongate member could be routed through a channel 219' of harness padding 217', and the distal end of the elongate member could include a stop member or a pull tab 144' that the user could pull to move the D-ring upward. For example, if the D-ring is in a downward position, the user could pull the stop member 144' to move the D-ring into an intermediate or upward position, and when the user releases the stop member 144' the D-ring could move into the intermediate or downward position, depending upon the configuration of the harness, any lifelines connected to the D-ring, etc. The D-ring could be selectively positioned in any one of several intermediate positions between a first, downward position and a second, upward position by selectively positioning the stop member 144'. If a biasing member is used, then the D-ring is urged into the downward position, and when the user releases the stop member 144', the D-ring is urged and moves into the downward position.

Although this embodiment is shown as a tensioning device for use with a dorsal D-ring of a safety harness, it is recognized that it may be used with any suitable connector movable relative to a strap or anchor member.

An embodiment combination safety harness and tensioning device could be used with the tensioning device 300 or any other suitable tensioning device. Any suitable safety harness could be used.

Figure 28:
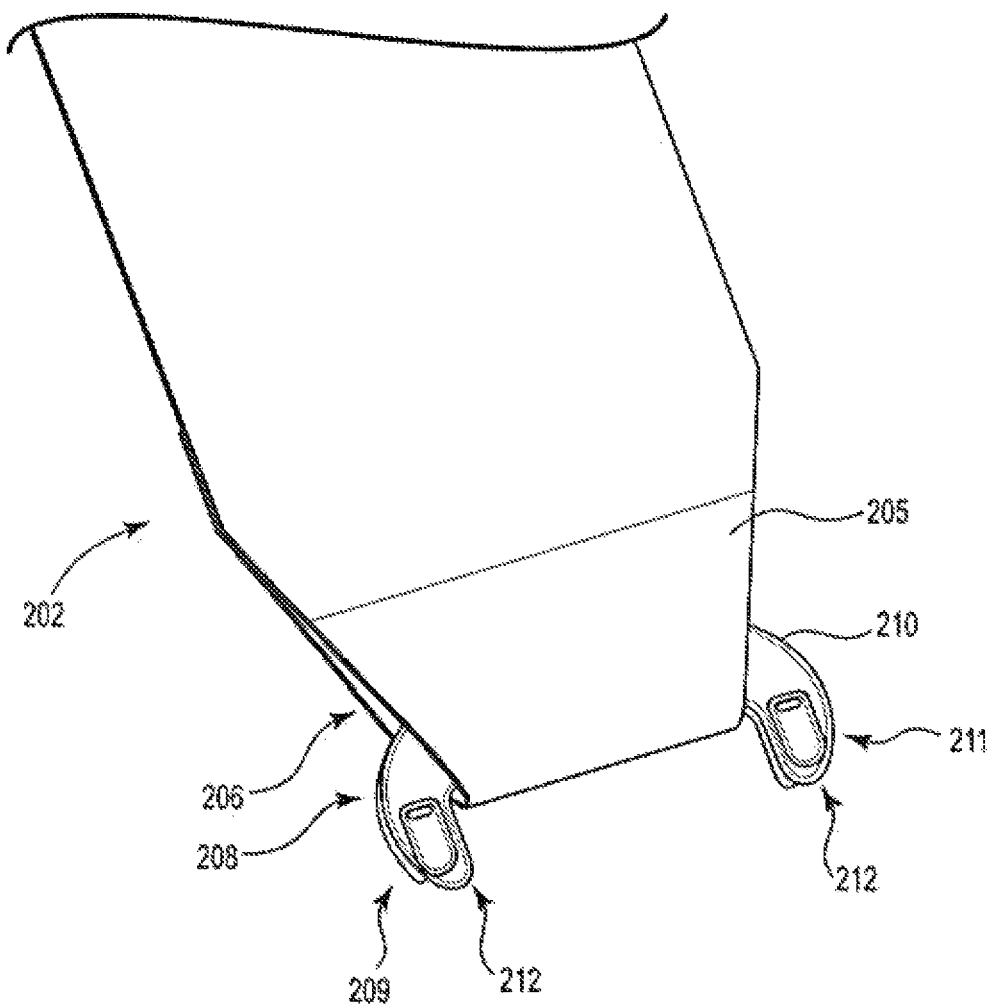
FIG. 28 is a perspective view of a channel guide of a combination safety harness and tensioning device connected to an end of a strap of the safety harness.
Figure 29:
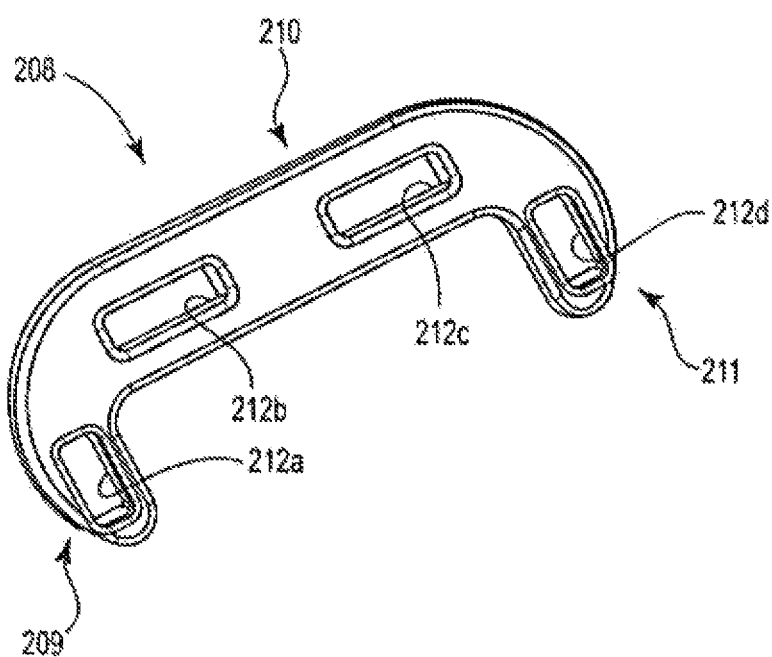
FIG. 29 is a perspective view of the channel guide shown in FIG. 28.
Figure 30:
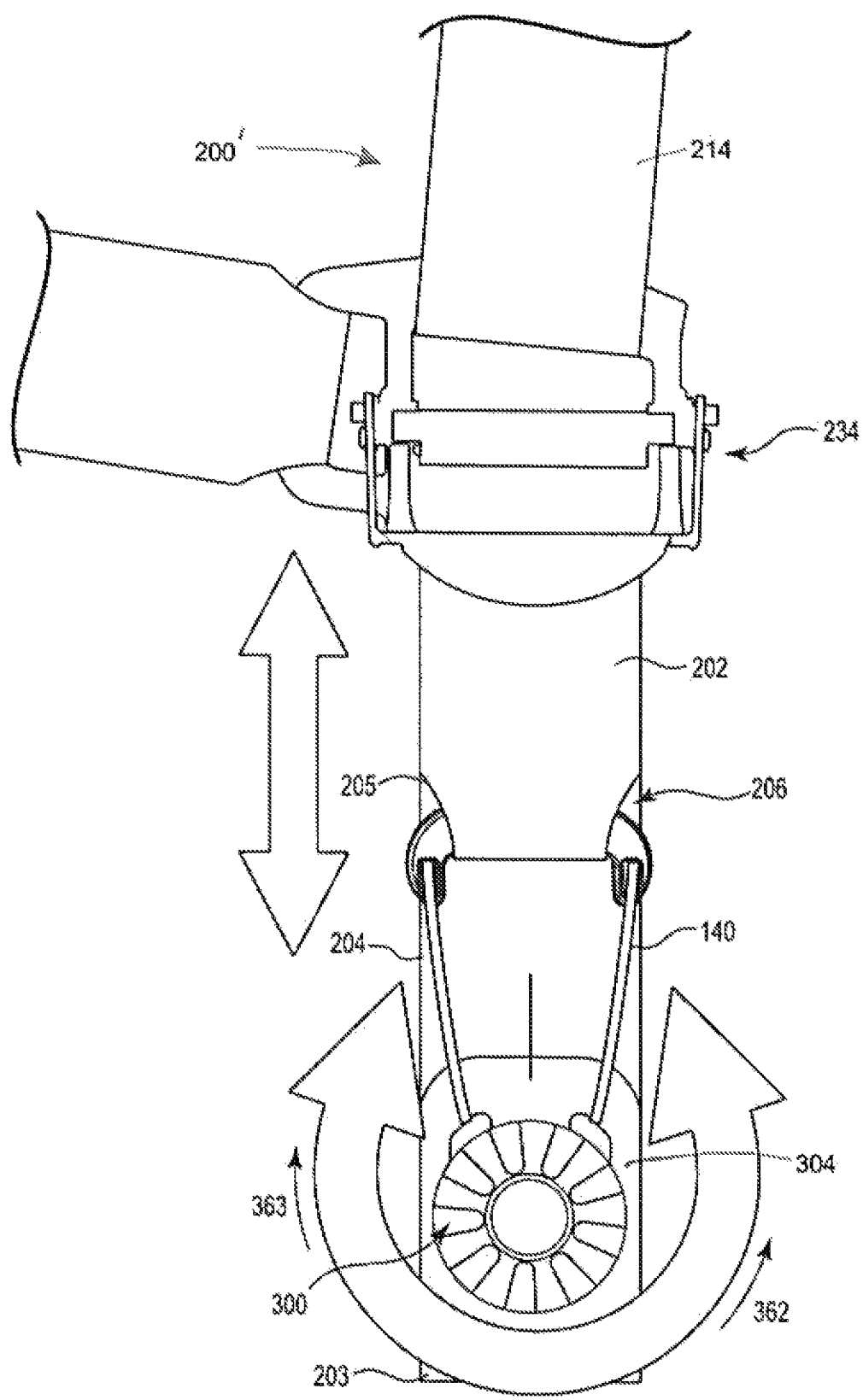
FIG. 30 is a plan view of another embodiment combination safety harness and tensioning device.

An example safety harness that could be used generally includes straps configured and arranged to be donned by a user as is well known in the art. As illustrated in FIG. 30, one example safety harness 200' includes a connector 234 such as a buckle interconnecting a first strap 202 and a second strap 214. The first strap 202 includes a first end 203 generally positioned proximate a user's hip or leg and an intermediate portion 204 extending upward toward a user's chest. For example, the first end 203 could be connected to a third strap of the harness, such as a leg strap. The intermediate portion 204 of the first strap 202 is selectively engaged by the connector 234 to adjust the length of the intermediate portion 204 extending between the first end 203 and the connector 234. A second end 205 of the first strap 202 extends downward from the intermediate portion 204 proximate the connector 234 toward the first end 203. In one example, the second end 205 is folded over onto itself and secured to form a strap channel 206. A channel guide 208 could be positioned within the strap channel 206, as shown in FIG. 28. The channel guide 208 includes a first end 209, an intermediate portion 210, and a second end 211 forming a channel 212 through which the loop in the elongate member 140 extends. The channel 212 could be generally U-shaped and include multiple channels through which the elongate member 140 could be routed, for example channels 212a, 212b, 212c, and 212d shown in FIG. 29. The channels 212a, 212b, 212c, and 212d could be integral with the channel guide 208. The channel guide 208 acts as a wear pad so that the elongate member 140 does not contact or has limited contact with the second end 205 of the first strap 202. A first end 215 of the second strap 214 is secured to the connector 234, and the second strap 214 extends toward the dorsal pad assembly.

In operation, the intermediate portion 145 of the elongate member 140 extends outward from the tensioning device 300, forming a loop that extends through the channel guide 208. As the dial 348 is rotated in one direction, the intermediate portion 145 is retracted into the housing 302 and wound about the base 330. The length of the intermediate portion 145 extending outward from the housing 302 is shortened thereby moving the second end 205 toward the first end 203 of the first strap 202. As the dial 348 is rotated in the other direction, the intermediate portion 145 is unwound from the base 330 and paid out from the housing 302. The length of the intermediate portion 145 extending outward from the housing 302 is lengthened thereby allowing the second end 205 to be moved away from the first end 203 of the first strap 202. Therefore, as the length of the intermediate portion 204 extending between the first end 203 and the connector 234 is adjusted, the length of the elongate member 140 extending outward from the tensioning device 300 can be adjusted to tension the first strap 202 as a strap keeper proximate its second end 205. The second end 205 is thereby secured to prevent it from getting caught on something during use. If a sleeve 355 is used, the sleeve 355 may extend and concertina as the length of the elongate member 140 extending outward from the tensioning device 300 changes.

Although this embodiment is shown with a tensioning device 300, it is recognized that any suitable tensioning device could be used. For example, the tensioning device could include ratchet pawls and a release mechanism or other suitable engaging assemblies instead of ball bearings.

In another example, a strap end stop could be secured to the distal end of the second end 205 and the elongate member could be secured to the strap end stop. In this example, the tensioning device 100 could be used and the second end 143 of the elongate member 140 could be secured to the strap end stop.

The above specification, embodiments, and data provide a complete description of the manufacture and use of the composition of embodiments of the disclosure. Although embodiments have been illustrated and described herein, it will be appreciated by those of ordinary skill in the art that any arrangement, which is calculated to achieve the same purpose, may be substituted for the embodiments. This application is intended to cover any adaptations or variations of the disclosure.

The invention claimed is:

1. A tensioning device, comprising:
   a housing including a cavity;
   an engaging assembly operatively connected to the housing and having an engaging member and a biasing member, the engaging member movable between an engaged position and a disengaged position, the biasing member urging the engaging member into the engaged position;
   a rotating member configured and arranged to be received in the cavity and rotatably operatively connected to the housing, the rotating member having a base and a flange, the flange having a receiver configured and arranged to receive a portion of the engaging member, the engaging member contacting the flange, the receiver being selectively aligned with the engaging member in the engaged position as the rotating member rotates;

an elongate member having a first end operatively connected to the rotating member and an intermediate portion windable about the base; and wherein the rotating member is rotatable in a first direction and a second direction relative to the housing, the second direction being opposite the first direction, the engaging member being positioned within the receiver in the engaged position to assist in preventing rotation of the rotating member in the first and second directions, wherein rotation of the rotating member overcomes the biasing member to move the engaging member out of the receiver and into the disengaged position to allow rotation in the first and second directions, the biasing member moving the engaging member into the engaged position when the engaging member is selectively aligned with the receiver.

2. The tensioning device of claim 1, wherein the receiver is at least one depression in the flange.

3. The tensioning device of claim 1, wherein the receiver is a plurality of depressions in the flange and the engaging member is selectively received in one of the plurality of depressions.

4. The tensioning device of claim 3, wherein the engaging assembly includes a plurality of engaging members, each engaging member aligned with one of the plurality of depressions when in the engaged position.

5. The tensioning device of claim 1, wherein the engaging assembly includes a retaining member configured and arranged to receive at least a portion of the engaging member and the biasing member, the biasing member being captured between the retaining member and the engaging member, the biasing member urging the engaging member to partially extend outward from the retaining member to contact the flange.

6. The tensioning device of claim 5, wherein the engaging member is a ball bearing.

7. The tensioning device of claim 6, wherein the receiver is at least one depression in the flange and a portion of the ball bearing extends into the at least one depression in the engaged position.

8. The tensioning device of claim 1, wherein the housing includes an exit guide path in communication with the cavity, the intermediate portion of the elongate member extending through the exit guide path.

9. The tensioning device of claim 1, wherein the elongate member has a second end operatively connected to the rotating member and the intermediate portion is windable about the base proximate the first and second ends.

10. The tensioning device of claim 9, wherein the housing includes a first exit guide path and a second exit guide path in communication with the cavity, the intermediate portion extending through each of the first and second guide paths.

11. A tensioning device, comprising:

a housing including a cavity;

an engaging assembly operatively connected to the housing and having an engaging member and a biasing member, the engaging member movable between an engaged position and a disengaged position, the biasing member urging the engaging member into the engaged position;

a rotating member configured and arranged to be received in the cavity and rotatably operatively connected to the housing, the rotating member having a base and a flange, the flange having a first side including a receiver configured and arranged to receive a portion of the engaging member, the engaging member and the biasing member being positioned proximate the first side, the receiver being selectively aligned with the engaging member as the rotating member rotates;

an elongate member having a first end operatively connected to the rotating member and an intermediate portion windable about the base; and wherein the rotating member is rotatable in a first direction and a second direction relative to the housing, the second direction being opposite the first direction, the engaging member being positioned within the receiver in the engaged position to assist in preventing rotation of the rotating member in the first and second directions, wherein rotation of the rotating member overcomes the biasing member to move the engaging member into the disengaged position and out of the receiver to allow rotation in the first and second directions, the biasing member moving the engaging member into the engaged position when the engaging member is selectively aligned with the receiver.

12. The tensioning device of claim 11, wherein the receiver is a plurality of depressions in the flange and the engaging member is selectively received in one of the plurality of depressions.

13. The tensioning device of claim 12, wherein the engaging assembly includes a plurality of engaging members, each engaging member aligned with one of the plurality of depressions when in the engaged position.

14. The tensioning device of claim 11, wherein the engaging assembly includes a retaining member configured and arranged to receive at least a portion of the engaging member and the biasing member, the biasing member being captured between the retaining member and the engaging member, the biasing member urging the engaging member to partially extend outward from the retaining member to contact the flange.

15. The tensioning device of claim 11, wherein the housing includes an exit guide path in communication with the cavity, the intermediate portion of the elongate member extending through the exit guide path.

16. The tensioning device of claim 11, wherein the elongate member has a second end operatively connected to the rotating member and the intermediate portion is windable about the base proximate the first and second ends.

17. A tensioning device, comprising:

a housing including a cavity;

an engaging assembly operatively connected to the housing, the engaging assembly including a retaining member configured and arranged to receive at least a portion of the engaging member and the biasing member, the biasing member being captured between the retaining member and the engaging member, the engaging member movable relative to the retaining member between an engaged position and a disengaged position and the biasing member urging the engaging member to partially extend outward from the retaining member to contact the flange, the biasing member urging the engaging member into the engaged position;

a rotating member configured and arranged to be received in the cavity and rotatably operatively connected to the housing, the rotating member having a base and a flange, the flange having a receiver configured and arranged to receive a portion of the engaging member, the receiver being selectively aligned with the engaging member as the rotating member rotates;

an elongate member having a first end operatively connected to the rotating member and an intermediate portion windable about the base; and wherein the rotating member is rotatable in a first direction and a second direction relative to the housing, the second direction being opposite the first direction, the engaging member being positioned within the receiver in the engaged position to assist in preventing rotation of the rotating member in the first and second directions, wherein rotation of the rotating member overcomes the biasing member to move the engaging member into the disengaged position and out of the receiver to allow rotation in the first and second directions, the biasing member moving the engaging member into the engaged position when the engaging member is selectively aligned with the receiver.

18. The tensioning device of claim 17, wherein the receiver is a plurality of depressions in the flange and the engaging member is selectively received in one of the plurality of depressions.

19. The tensioning device of claim 18, wherein the engaging assembly includes a plurality of engaging members, each engaging member aligned with one of the plurality of depressions when in the engaged position.

20. The tensioning device of claim 17, wherein the housing includes an exit guide path in communication with the cavity, the intermediate portion of the elongate member extending through the exit guide path.

21. The tensioning device of claim 17, wherein the elongate member has a second end operatively connected to the rotating member and the intermediate portion is windable about the base proximate the first and second ends.

* * * * *